(12) United States Patent
Jaygarl et al.

(10) Patent No.: US 10,818,289 B2
(45) Date of Patent: Oct. 27, 2020

(54) METHOD FOR OPERATING SPEECH RECOGNITION SERVICE AND ELECTRONIC DEVICE FOR SUPPORTING THE SAME

(71) Applicant: Samsung Electronics Co., Ltd., Gyeonggi-do (KR)

(72) Inventors: Ho Jun Jaygarl, Gyeonggi-do (KR); Seung Gyu Kong, Gyeonggi-do (KR); Jin Woong Kim, Gyeonggi-do (KR); Bu Cheon Min, Gyeonggi-do (KR); Kwang Bin Lee, Gyeonggi-do (KR); Jae Hwan Lee, Gyeonggi-do (KR); Sung Yul Choe, Gyeonggi-do (KR); Ga Jin Song, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 166 days.

(21) Appl. No.: 16/039,738

(22) Filed: Jul. 19, 2018

(65) Prior Publication Data
US 2019/0066674 A1 Feb. 28, 2019

(30) Foreign Application Priority Data
Aug. 28, 2017 (KR) .......................... 10-2017-0108915

(51) Int. Cl.
*G10L 15/22* (2006.01)
*G06F 3/16* (2006.01)
*G06F 3/0488* (2013.01)

(52) U.S. Cl.
CPC .......... *G10L 15/22* (2013.01); *G06F 3/04886* (2013.01); *G06F 3/167* (2013.01); *G10L 2015/223* (2013.01); *G10L 2015/228* (2013.01)

(58) Field of Classification Search
CPC ......... G10L 15/22; G10L 15/00; G10L 15/01; G10L 15/06; G10L 15/18; G10L 15/1815;
(Continued)

(56) References Cited

U.S. PATENT DOCUMENTS

| 2014/0249831 | A1* | 9/2014 | Gallopyn | G16H 40/20 |
| | | | | 705/2 |
| 2016/0328270 | A1* | 11/2016 | Bikkula | G06F 9/4881 |
| 2018/0329957 | A1* | 11/2018 | Frazzingaro | G06F 21/6254 |

FOREIGN PATENT DOCUMENTS

| KR | 10-2018-0108321 A | 10/2018 |
| KR | 10-2018-0120427 A | 11/2018 |
| KR | 10-2019-0021088 A | 3/2019 |

* cited by examiner

*Primary Examiner* — Qi Han
(74) *Attorney, Agent, or Firm* — Cha & Reiter, LLC

(57) ABSTRACT

An electronic device and method are disclosed herein. The electronic device includes a touchscreen, a wireless communication circuit, a microphone, a processor and memory storing instructions implementing the method, including: receiving a first user input including a request to perform a task, transmitting first data associated with the first user input to an external server, receiving a sequence of states executable to perform the task, detecting whether at least one first parameter is omitted from the first user input based on whether execution type information is received with the sequence of states, when the execution type information is received, displaying a graphical user interface (GUI) including at least one input field requesting input of the at least one first parameter, and when the execution type information is not received from the external server, executing a portion of the sequence of states to perform a portion of the task.

20 Claims, 22 Drawing Sheets

(58) Field of Classification Search
CPC . G10L 15/1822; G10L 15/183; G10L 15/187;
G10L 15/19; G10L 15/20; G10L 15/26;
G10L 2015/22; G10L 2015/00; G10L
2015/06; G10L 2015/08; G10L 2015/223;
G10L 2015/225; G10L 2015/228
USPC .... 704/275, 270.1, 270, 231, 236, 243, 246,
704/250, 251, 257
See application file for complete search history.

METHOD FOR OPERATING SPEECH RECOGNITION SERVICE AND ELECTRONIC DEVICE FOR SUPPORTING THE SAME

CROSS-REFERENCE TO RELATED APPLICATION(S)

This application is based on and claims priority under 35 U.S.C. § 119 to Korean Patent Application No. 10-2017-0108915, filed on Aug. 28, 2017, in the Korean Intellectual Property Office, the disclosure of which is incorporated by reference herein its entirety.

BACKGROUND

1. Field

The present disclosure relates to a method for operating a speech recognition service and an electronic device for supporting the same.

2. Description of Related Art

Recently, electronic devices such as smartphones have developed in the variety of available input methods facilitating interaction with users. For example, electronic devices may allow for voice commands, in which voice data is received corresponding to user speech, in the context of a specified application. In addition, the electronic device may support speech recognition services capable of recognizing input voice data and identifying an intent or command indicated by the user speech, and performing a function corresponding to the derived intent.

The above information is presented as background information only to assist with an understanding of the present disclosure. No determination has been made, and no assertion is made, as to whether any of the above might be applicable as prior art with regard to the present disclosure.

SUMMARY

A function action of an electronic device, corresponding to an intent of a user utterance, may be performed according to a sequence of 'unit' actions generated using an information resource (or a parameter) included in the user utterance. Thus, when an information resource is insufficient with regards to the user utterance, at least some of the unit actions may be generated even though the total sequence of actions is incomplete. In response, since the electronic device is unable to complete the performance of the requested function as based on the identified intent of the user voice command, the device may fail to process a voice command of a user.

In this regard, the electronic device may request the user to provide an additional input to obtain information omitted in the user command. For example, the electronic device may request the user to provide information required to perform a corresponding unit action at a time when an incomplete unit action is changed to a performable state. However, the request to provide the additional input, repeatedly generated according to omission of a plurality of information resources or a plurality of incomplete unit actions, may delay a processing time of the user utterance or may result in deterioration in processing reliability.

Aspects of the present disclosure are to address at least the above-mentioned problems and/or disadvantages and to provide at least the advantages described below. Accordingly, an aspect of the present disclosure is to provide a method for operating a speech recognition service to perform a function action (or a task) corresponding to an in complete utterance by collectively obtaining information resources required to process the incomplete utterance of a user and an electronic device for supporting the same.

In accordance with an aspect of the present disclosure, an electronic device is disclosed, including a touch screen display, a wireless communication circuit, a microphone, at least one processor and a memory storing instructions executable to cause the electronic device to: receive a first user input including a request to perform a task via the microphone, transmit first data associated with the first user input to an external server via the wireless communication circuit, receive from the external server a sequence of states executable by the electronic device to perform the task via the wireless communication circuit, detect whether at least one first parameter is omitted from the first user input, based on whether execution type information is received from the server with the received sequence of states, when the execution type information is received from the external server, display a graphical user interface (GUI) including at least one input field requesting input of the at least one first parameter, and when the execution type information is not received from the external server, execute a portion of the sequence of states less than an entirety of the sequence of states to perform a portion of the task.

According to an embodiment, the at least one memory may store instructions, when executed, causing the processor to receive a first user input including a request to perform a task which requires at least one parameter, via the microphone, transmit first data associated with the first user input to an external server via the wireless communication circuit, receive a response including information about a sequence of states of the electronic device for performing the task from the external server via the wireless communication circuit, and determine whether the information about the sequence of the states includes one of a plurality of information about a sequence selected by the external server.

According to an embodiment, the at least one memory may store instructions, when executed, causing the processor to, when it is determined that the information about the sequence of the states includes the one of the plurality of information about the selected sequence, output a graphic user interface (GUI) including at least one input field for the at least one parameter and output a request to receive at least one of parameters omitted on the first user input, through the touch screen display or the at least one speaker.

According to an embodiment, the at least one memory may store instructions, when executed, causing the processor to, when it is determined that the information about the sequence of the states does not include the one of the plurality of information about the selected sequence, perform a portion of the task as the electronic device proceeds with a portion of the sequence of the states rather than all the sequence of the states using at least some of parameters previously provided by the first user input.

According to various embodiments, the electronic device may explicitly request the user to provide an information resource (or a parameter) omitted on an incomplete utterance through a graphic user interface (GUI) output upon occurrence of the incomplete utterance.

According to various embodiments, the electronic device may shorten a processing speed of a user utterance or may simplify a procedure of the user utterance by collectively obtaining an omitted information resource (or an omitted parameter) based on the GUI.

In addition, various effects directly or indirectly ascertained through the present disclosure may be provided.

In accordance with an aspect of the present disclosure, a method in an electronic device is disclosed, including receiving a first user input including a request to perform a task, transmitting first data associated with the first user input to an external server using a wireless communication circuit, receiving from the external server a sequence of states executable by the electronic device to perform the task, detecting by at least one processor whether at least one first parameter is omitted from the first user input, based on whether execution type information is received from the server with the received sequence of states, when the execution type information is received from the external server, displaying by a touch screen display a graphical user interface (GUI) including at least one input field requesting input of the at least one first parameter, and when the execution type information is not received from the external server, executing a portion of the sequence of states less than an entirety of the sequence of states to perform a portion of the task.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
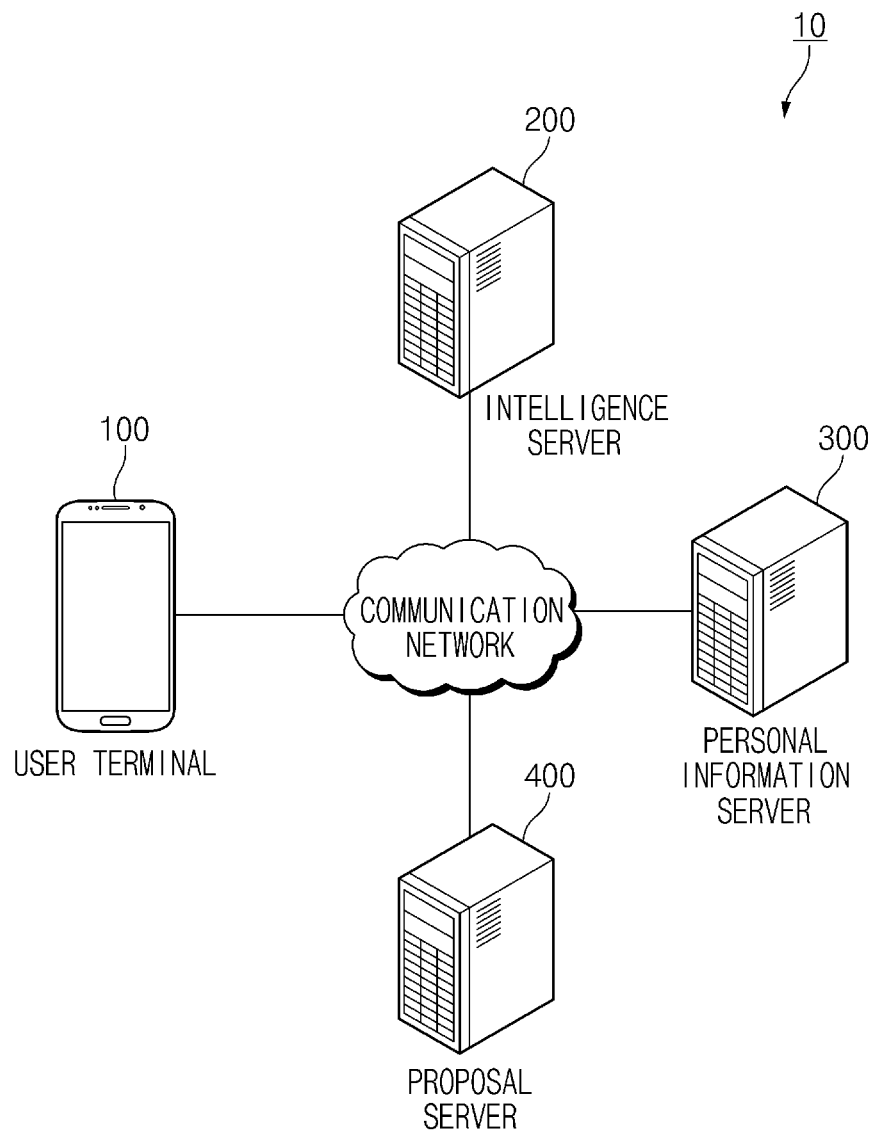
FIG. 1A is a drawing illustrating an integrated intelligent system according to an embodiment.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the present disclosure. With regard to description of drawings, similar elements may be marked by similar reference numerals.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the scope of another embodiment. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as being customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

Prior to describing the present disclosure, a description will be given of an integrated intelligent system to which various embodiments of the present disclosure are applicable with reference to FIGS. 1A to 1F.

FIG. 1A is a drawing illustrating an integrated intelligent system according to an embodiment.

Referring to FIG. 1A, an integrated intelligent system 10 may include a user terminal 100, an intelligence server 200, a personal information server 300, or a proposal server 400.

The user terminal 100 may provide a service necessary for a user through an app (or an application program) (e.g., an alarm app, a message app, a photo (gallery) app, or the like) stored in the user terminal 100. For example, the user terminal 100 may execute and operate another app through an intelligence app (or a speech recognition app) stored in the user terminal 100. The user terminal 100 may receive a user input for executing and operating the other app through the intelligence app. The user input may be received through, for example, a physical button, a touch pad, a voice input, a remote input, or the like. According to an embodiment, the user terminal 100 may correspond to each of various terminals devices (or various electronic devices) connectable to the Internet, for example, a mobile phone, a smartphone, a personal digital assistant (PDA), or a notebook computer.

According to an embodiment, the user terminal 100 may receive an utterance of a user as a user input. The user terminal 100 may receive the utterance of the user and may generate a command to operate an app based on the utterance of the user. Thus, the user terminal 100 may operate the app using the command.

The intelligence server 200 may receive a voice input of the user over a communication network from the user terminal 100 and may change the received voice input to text data. In another embodiment, the intelligence server 200 may generate (or select) a path rule based on the text data. The path rule may include information about an action (or an operation) for performing a function of an app or information about a parameter necessary to execute the action. Further, the path rule may include an order of the action of the app.

The user terminal 100 may receive the path rule and may select an app depending on the path rule, thus executing an action included in the path rule in the selected app. In general, the term "path rule" in the present disclosure may refer to, but is not limited to, a sequence of states for an electronic device (or the user terminal 100) to perform a task requested by the user. In other words, the path rule may include information about the sequence of the states. The task may be, for example, any action applicable by an intelligence app. The task may include generating a schedule, transmitting a photo to a desired target, or providing weather information. The user terminal 100 may perform the task by sequentially having at least one state (e.g., an action state of the user terminal 100).

According to an embodiment, the path rule may be provided or generated by an artificial intelligence (AI) system. The AI system may be a rule-based system or may a neural network-based system (e.g., a feedforward neural network (FNN) or a recurrent neural network (RNN)). Alternatively, the AI system may be a combination of the above-mentioned systems or an AI system different from the above-mentioned systems. According to an embodiment, the path rule may be selected from a set of pre-defined path rules or may be generated in real time in response to a user request. For example, the AI system may select at least one of a plurality of pre-defined path rules or may generate a path rule on a dynamic basis (or on a real-time basis). Further, the user terminal 100 may use a hybrid system for providing a path rule.

According to an embodiment, the user terminal 100 may execute the action and may display a screen corresponding to a state of the user terminal 100 which executes the action on its display. For another example, the user terminal 100 may execute the action and may not display at least one of the result of performing the action on the display. For example, the user terminal 100 may execute a plurality of actions and may display the result of performing some of the plurality of actions on the display. For example, the user terminal 100 may display the result of executing an action of the final order on the display. For another example, the user terminal 100 may receive an input of the user and may display the result of executing the action at a corresponding time on the display.

The personal information server 300 may include a database (DB) in which user information is stored. For example, the personal information server 300 may receive user information (e.g., context information, app execution information, or the like) from the user terminal 100 and may store the received user information in the DB. The personal information server 300 may transmit the user information to the intelligence server 200 over the communication network to support to perform a function of the intelligence server 200 (e.g., generate a path rule for a user input). According to an embodiment, the user terminal 100 may receive user information over the communication network from the personal information server 300 and may use the user information as information for managing the DB.

The proposal server 400 may include a DB which stores information about a function in the user terminal 100 or a function capable of being provided through an application. For example, the proposal server 400 may include a DB which stores information about a function generated using user information of the user terminal 100, stored in the personal information server 300. The user terminal 100 may receive the information about the function to be provided, over the communication network from the proposal server 400 and may provide the received information to the user.

Figure 1B:
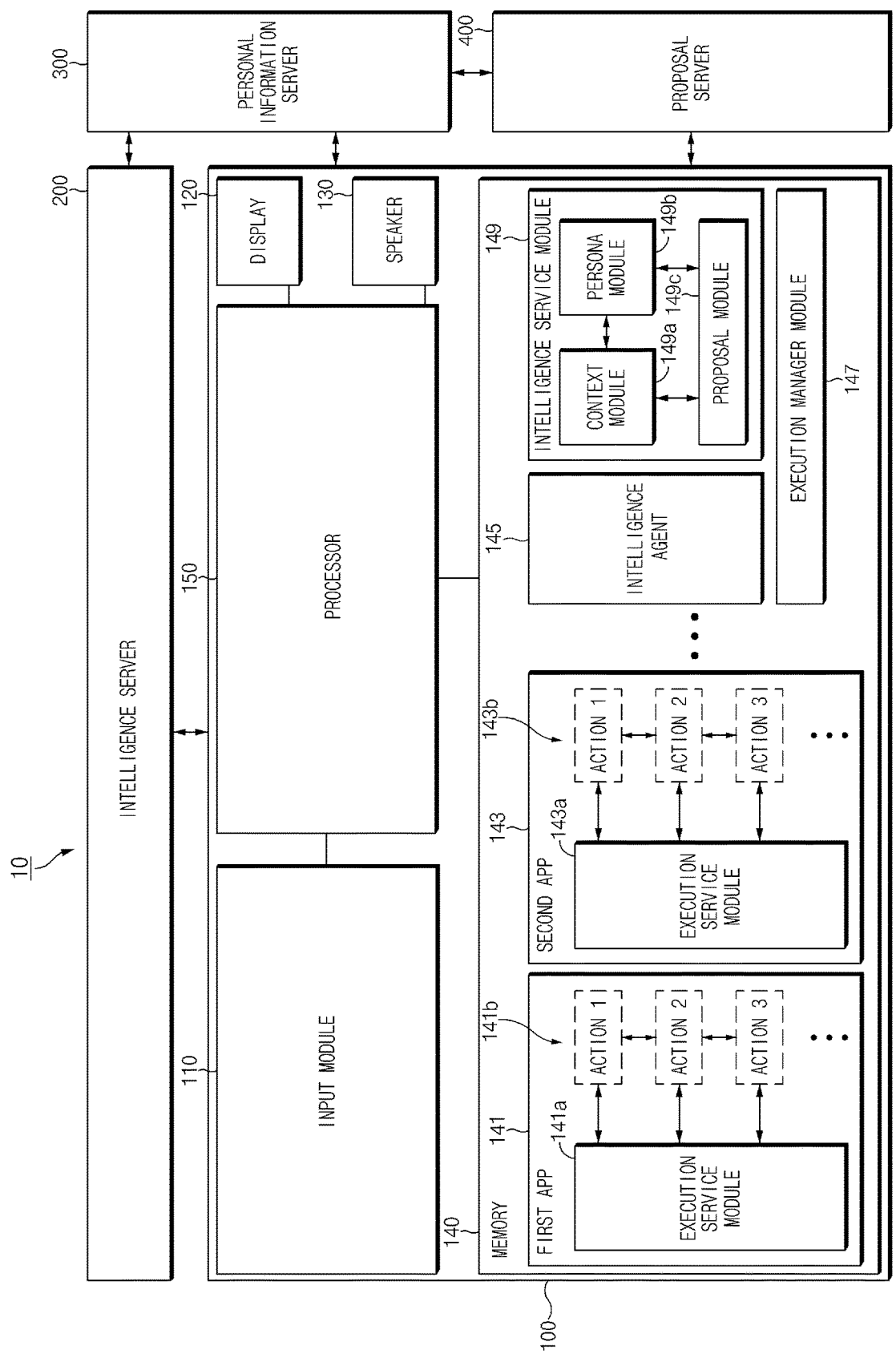
FIG. 1B is a block diagram illustrating a user terminal of an integrated intelligent system according to an embodiment.

FIG. 1B is a block diagram illustrating a user terminal of an integrated intelligent system according to an embodiment.

Referring to FIG. 1B, a user terminal 100 may include an input module 110, a display 120, a speaker 130, a memory 140, or a processor 150. At least a portion (e.g., the input module 110, the display 120, the speaker 130, the memory 140, or the like) of the elements of the user terminal 100 may be electrically or operatively connected to the processor 150. The user terminal 100 may further include a housing. The elements of the user terminal 100 may be received in the housing or may be located on the housing. The user terminal 100 may further include a communication circuit located in the housing. The user terminal 100 may transmit and receive data (or information) with an external server (e.g., an intelligence server 200) via the communication circuit. In various embodiments, the user terminal 100 may be referred to as an electronic device and may further include an element of an electronic device 1701 to be described with reference to FIG. 17.

The input module 110 according to an embodiment may receive a user input from a user. For example, the input module 110 may receive a user input from an external device (e.g., a keyboard or a headset) connected to the input module 110. For another example, the input module 110 may include a touch screen (e.g., a touch screen display) combined with the display 120. For another example, the input module 110 may include a hardware key (or a physical key) located in the user terminal 100 (or the housing of the user terminal 100).

According to an embodiment, the input module 110 may include a microphone capable of receiving an utterance of the user as a voice signal. For example, the input module 110 may include a speech input system and may receive an utterance of the user as a voice signal via the speech input system. At least a portion of the microphone may be exposed through, for example, one region (e.g., a first region) of the housing. In an embodiment, the microphone may be controlled in a state where it is continually driven (e.g., where it is always on) to receive an input (e.g., a voice input) according to an utterance of the user or may be controlled to be driven when a user operation is applied to a hardware key (e.g., a hardware key 112 of FIG. 1C) provided in one region of the user terminal 100. The user operation may include a press operation or a press and hold operation to the hardware key 112.

The display 120 according to an embodiment may display an image or video and/or a screen where an application is executed. For example, the display 120 may display a graphic user interface (GUI) of an app. In an embodiment, the display 120 may be at least in part exposed through one region (e.g., a second region) of the housing to receive an input (e.g., a touch input, a drag input, or the like) by a user's body (e.g., a finger).

According to an embodiment, the speaker 130 may output a voice signal. For example, the speaker 130 may output a voice signal which is generated in the user terminal 100 or is received from an external device (e.g., an intelligence server 200 of FIG. 1A). According to an embodiment, the speaker 130 may be at least in part exposed through one region (e.g., a third region) of the housing.

According to an embodiment, the memory 140 may store a plurality of apps (or application programs) 141 and 143. Each of the plurality of apps 141 and 143 may be, for example, a program for performing a function corresponding to a user input. According to an embodiment, the memory 140 may store an intelligence agent 145, an execution manager module 147, or an intelligence service module 149. Each of the intelligence agent 145, the execution manager module 147, and the intelligence service module 149 may be, for example, a framework (or an application framework) for processing a received user input (e.g., a user utterance).

According to an embodiment, the memory 140 may include a DB capable of storing information necessary to recognize a user input. For example, the memory 140 may include a log DB capable of storing log information. For another example, the memory 140 may include a persona DB capable of storing user information.

According to an embodiment, the memory 140 may store the plurality of apps 141 and 143. The plurality of apps 141 and 143 may be loaded to executing the specified operation. For example, the plurality of apps 141 and 143 stored in the memory 140 may be loaded by the execution manager module 147 to operate. The plurality of apps 141 and 143 may respectively include execution service modules 141a and 143a for performing a function. In an embodiment, the plurality of apps 141 and 143 may execute a plurality of actions 141b and 143b (e.g., a sequence of states), respectively, through the execution service modules 141a and 143a, for perform a function. In other words, the execution service modules 141a and 143a may be activated by the execution manager module 147 and may execute the plurality of actions 141b and 143b, respectively.

According to an embodiment, when the actions 141b and 143b of the apps 141 and 143 are executed, an execution state screen according to the execution of the actions 141b and 143b may be displayed on the display 120. The execution state screen may be, for example, a screen of a state where the actions 141b and 143b are completed. For another example, the execution state screen may be, for example, a screen of a state (partial landing) where the execution of the actions 141b and 143b is stopped (e.g., when a parameter necessary for the actions 141b and 143b is not input).

The execution service modules 141a and 143a according to an embodiment may execute the actions 141b and 143b, respectively, depending on a path rule. For example, the execution service modules 141a and 143a may be activated by the execution manager module 147 and may execute a function of each of the apps 141 and 143 by receiving an execution request depending on the path rule from the execution manager module 147 and performing the actions 141b and 143b depending on the execution request. When the performance of the actions 141b and 143b is completed, the execution service modules 141a and 143a may transmit completion information to the execution manager module 147.

According to an embodiment, when the plurality of actions 141b and 143b are respectively executed in the apps 141 and 143, the plurality of actions 141b and 143b may be sequentially executed. When execution of one action (e.g., action 1 of the first app 141 or action 1 of the second app 143) is completed, the execution service modules 141a and 143a may open a next action (e.g., action 2 of the first app 141 or action 2 of the second app 143) and may transmit completion information to the execution manager module 147. Herein, opening any action may be understood as changing the any operation to an executable state or preparing for executing the any action. In other words, when the any operation is not opened, it may fail to be executed. When the completion information is received, the execution manager module 147 may transmit a request to execute the next action (e.g., action 2 of the first app 141 or action 2 of the second app 143) to the execution service modules 141a and 143a. According to an embodiment, when the plurality of apps 141 and 143 are executed, they may be sequentially executed. When receiving completion information after execution of a final action (e.g., action 3) of the first app 141 is completed, the execution manager module 147 may transmit a request to execute a first action (e.g., action 1) of the second app 143 to the execution service module 143a.

According to an embodiment, when the plurality of actions 141b and 143b are respectively executed in the apps 141 and 143, a result screen according to the execution of each of the plurality of actions 141b and 143b may be displayed on the display 120. According to an embodiment, some of a plurality of result screens according to the execution of the plurality of actions 141b and 143b may be displayed on the display 120.

According to an embodiment, the memory 140 may store an intelligence app (e.g., a speech recognition app) which interworks with an intelligence agent 145. The app which interworks with the intelligence agent 145 may receive and process an utterance of the user as a voice signal. According to an embodiment, the app which interworks with the intelligence agent 145 may be operated by a specific input (e.g., an input through a hardware key, an input through a touch screen, or a specific voice input) input through the input module 110.

According to an embodiment, the intelligence agent 145, the execution manager module 147, or the intelligence service module 149 stored in the memory 140 may be executed by the processor 150. A function of the intelligence agent 145, the execution manager module 147, or the intelligence service module 149 may be implemented by the processor 150. The function of the intelligence agent 145, the execution manager module 147, or the intelligence service module 149 will be described as an operation of the processor 150. According to an embodiment, the intelligence agent 145, the execution manager module 147, or the intelligence service module 149 stored in the memory 140 may be implemented with hardware as well as software.

According to an embodiment, the processor 150 may control an overall operation of the user terminal 100. For example, the processor 150 may control the input module 110 to receive a user input. The processor 150 may control the display 120 to display an image. The processor 150 may control the speaker 130 to output a voice signal. The processor 150 may control the memory 140 to execute a program and fetch or store necessary information.

According to an embodiment, the processor 150 may execute the intelligence agent 145, the execution manager module 147, or the intelligence service module 149 stored in the memory 140. Thus, the processor 150 may implement a function of the intelligence agent 145, the execution manager module 147, or the intelligence service module 149.

The processor 150 according to an embodiment may execute the intelligence agent 145 to generate a command to operate an app based on a voice signal received as a user input. The processor 150 according to an embodiment may execute the execution manager module 147 to execute the apps 141 and 143 stored in the memory 140 based on the generated command. According to an embodiment, the processor 150 may execute the intelligence service module 149 to manage information about the user and process a user input using the information about the user.

The processor 150 may execute the intelligence agent 145 to transmit a user input received through the input module 110 to an intelligence server 200 and process the user input through the intelligence server 200.

According to an embodiment, the processor 150 may execute the intelligence agent 145 to preprocess the user input before transmitting the user input to the intelligence server 200. According to an embodiment, to preprocess the user input, the intelligence agent 145 may include an adaptive echo canceller (AEC) module, a noise suppression (NS) module, an end-point detection (EPD) module, or an automatic gain control (AGC) module. The AEC module may cancel an echo included in the user input. The NS module may suppress background noise included in the user input. The EPD module may detect an end point of a user voice included in the user input and may find a portion where there is a voice of the user, using the detected end point. The AGC module may adjust volume of the user input to be suitable for recognizing the user input and processing the recognized user input. According to an embodiment, the processor 150 may execute all the preprocessing elements for performance. However, in another embodiment, the processor 150 may execute some of the preprocessing elements to operate with a low power.

According to an embodiment, the intelligence agent 145 may execute a wake-up recognition module stored in the memory 140 to recognize calling of the user. Thus, the processor 150 may recognize a wake-up command of the user using the wake-up recognition module. When receiving the wake-up command, the processor 150 may activate the intelligence agent 145 for receiving a user input. The wake-up recognition module may be implemented with a low-power processor (e.g., a processor included in an audio codec). According to an embodiment, the processor 150 may execute the intelligence agent 145 when receiving a user input through a hardware key. When the intelligence agent 145 is executed, an intelligence app (e.g., a speech recognition app) which interworks with the intelligence agent 145 may be executed.

According to an embodiment, the intelligence agent 145 may include a speech recognition module for executing a user input. The processor 150 may recognize a user input for executing an action in an app using the speech recognition module. For example, the processor 150 may recognize a limited user (voice) input for executing an action such as the wake-up command (e.g., utterance like "a click" for executing an image capture operation while a camera app is executed) using the speech recognition module. The processor 150 may help the intelligence server 200 with recognizing and quickly process a user command capable of being processed in the user terminal 100, using the voice recognition module. According to an embodiment, the speech recognition module of the intelligence agent 145 for executing the user input may be implemented in an app processor.

According to an embodiment, the speech recognition module (including a speech recognition module of the wake-up recognition module) in the intelligence agent 145 may recognize a user input using an algorithm for recognizing a voice. The algorithm used to recognize the voice may be at least one of, for example, a hidden Markov model (HMM) algorithm, an artificial neural network (ANN) algorithm, or a dynamic time warping (DTW) algorithm.

According to an embodiment, the processor 150 may execute the intelligence agent 145 to convert a voice input of the user into text data. According to an embodiment, the processor 150 may transmit a voice of the user to the intelligence server 200 via the intelligence agent 145 and may receive text data corresponding to the voice of the user from the intelligence server 200. Thus, the processor 150 may display the converted text data on the display 120.

According to an embodiment, the processor 150 may execute the intelligence agent 145 to receive a path rule from the intelligence server 200. According to an embodiment, the processor 150 may transmit the path rule to the execution manager module 147 via the intelligence agent 145.

According to an embodiment, the processor 150 may execute the intelligence agent 145 to transmit an execution result log according to the path rule received from the intelligence server 200 to the intelligence service module 149. The transmitted execution result log may be accumulated and managed in preference information of the user, stored in a persona module (or a persona manager) 149b.

The processor 150 according to an embodiment may execute the execution manager module 147 to receive a path rule from the intelligence agent 145 and execute the apps 141 and 143 such that the apps 141 and 143 respectively execute the actions 141b and 143b included in the path rule. For example, the processor 150 may transmit command information (e.g., path rule information) for executing the actions 141b and 143b to the apps 141 and 143 via the execution manager module 147 and may receive completion information of the actions 141b and 143b from the apps 141 and 143.

According to an embodiment, the processor 150 may execute the execution manager module 147 to transmit command information (e.g., path rule information) for executing the actions 141b and 143b of the apps 141 and 143 between the intelligence agent 145 and the apps 141 and 143. The processor 150 may bind the apps 141 and 143 to be executed according to the path rule using the execution manager module 147 and may transmit command information (e.g., path rule information) of the actions 141b and 143b included in the path rule to the apps 141 and 143. For example, the processor 150 may sequentially transmit the actions 141b and 143b included in the path rule to the apps 141 and 143 via the execution manager module 147 and may sequentially execute the actions 141b and 143b of the apps 141 and 143 depending on the path rule.

According to an embodiment, the processor 150 may execute the execution manager module 147 to manage a state where the actions 141b and 143b of the apps 141 and 143 are executed. For example, the processor 150 may receive information about a state where the actions 141b and 143b are executed from the apps 141 and 143 via the execution manager module 147. For example, when the state where the actions 141b and 143b are executed is a stopped state (partial landing) (e.g., when a parameter necessary for the actions 141b and 143b is not input), the processor 150 may transmit information about the state (partial landing) to the intelligence agent 145 via the execution manager module 147. The processor 150 may request the user to input necessary information (e.g., a necessary parameter), using the received information via the intelligence agent 145. For another example, when the state where the actions 141b and 143b are executed is an action state, the processor 150 may receive utterance from the user via the intelligence agent 145. The processor 150 may transmit the executed apps 141 and 143 and information about a state where the apps 141 and 143 are executed to the intelligence agent 145 via the execution manager module 147. The processor 150 may transmit the user utterance to the intelligence server 200 via the intelligence agent 145. The processor 150 may receive parameter information of an utterance of the user through the intelligence server 200 via the intelligence agent 145. The processor 150 may transmit the received parameter information to the execution manager module 147 via the intelligence agent 145. The execution manager module 147 may change a parameter of each of the actions 141*b* and 143*b* to a new parameter using the received parameter information.

According to an embodiment, the processor 150 may execute the execution manager module 147 to transmit parameter information included in the path rule to the apps 141 and 143. When the plurality of apps 141 and 143 are sequentially executed according to the path rule, the execution manager module 147 may transmit the parameter information included in the path rule from one app to another app.

According to an embodiment, the processor 150 may execute the execution manager module 147 to receive a plurality of path rules. The processor 150 may select the plurality of path rules based on an utterance of the user using the execution manager module 147. For example, when an utterance of the user specifies some apps (e.g., the first app 141) to execute some actions (e.g., the action 141*b*) through the execution manager module 147, but when it does not specify other apps (e.g., the second app 143) to execute the other actions (e.g., the action 143*b*), the processor 150 may receive a plurality of different path rules capable of executing the same app (e.g., the first app 141) (e.g., a gallery app) to execute the some actions (e.g., the action 141*b*) and different apps (e.g., the second app 143) (e.g., a message app and a telegram app) capable of executing the other actions (e.g., the action 143*b*). The processor 150 may execute the same actions 141*b* and 143*b* (e.g., the consecutive same actions 141*b* and 143*b*) of the plurality of path rules using the execution manager module 147. When executing the same actions, the processor 150 may display a state screen capable of selecting the different apps 141 and 143 included in the plurality of path rules on the display 120 using the execution manager module 147.

According to an embodiment, the intelligence service module 149 may include a context module 149*a*, a persona module 149*b*, or a proposal module 149*c*.

The context module 149*a* may collect a current state of each of the apps 141 and 143 from the apps 141 and 143. For example, the context module 149*a* may receive context information indicating the current state of each of the apps 141 and 143 and may collect the current state of each of the apps 141 and 143.

The persona module 149*b* may manage personal information of the user who uses the user terminal 100. For example, the persona module 149*b* may collect information about the use of the user terminal 100 and the result of performing the user terminal 100 and may manage the personal information of the user.

The proposal module 149*c* may predict an intent of the user and may recommend a command to the user. For example, the proposal module 149*c* may recommend the command to the user in consideration of a current state (e.g., time, a place, a situation, or an app) of the user.

Figure 1C:
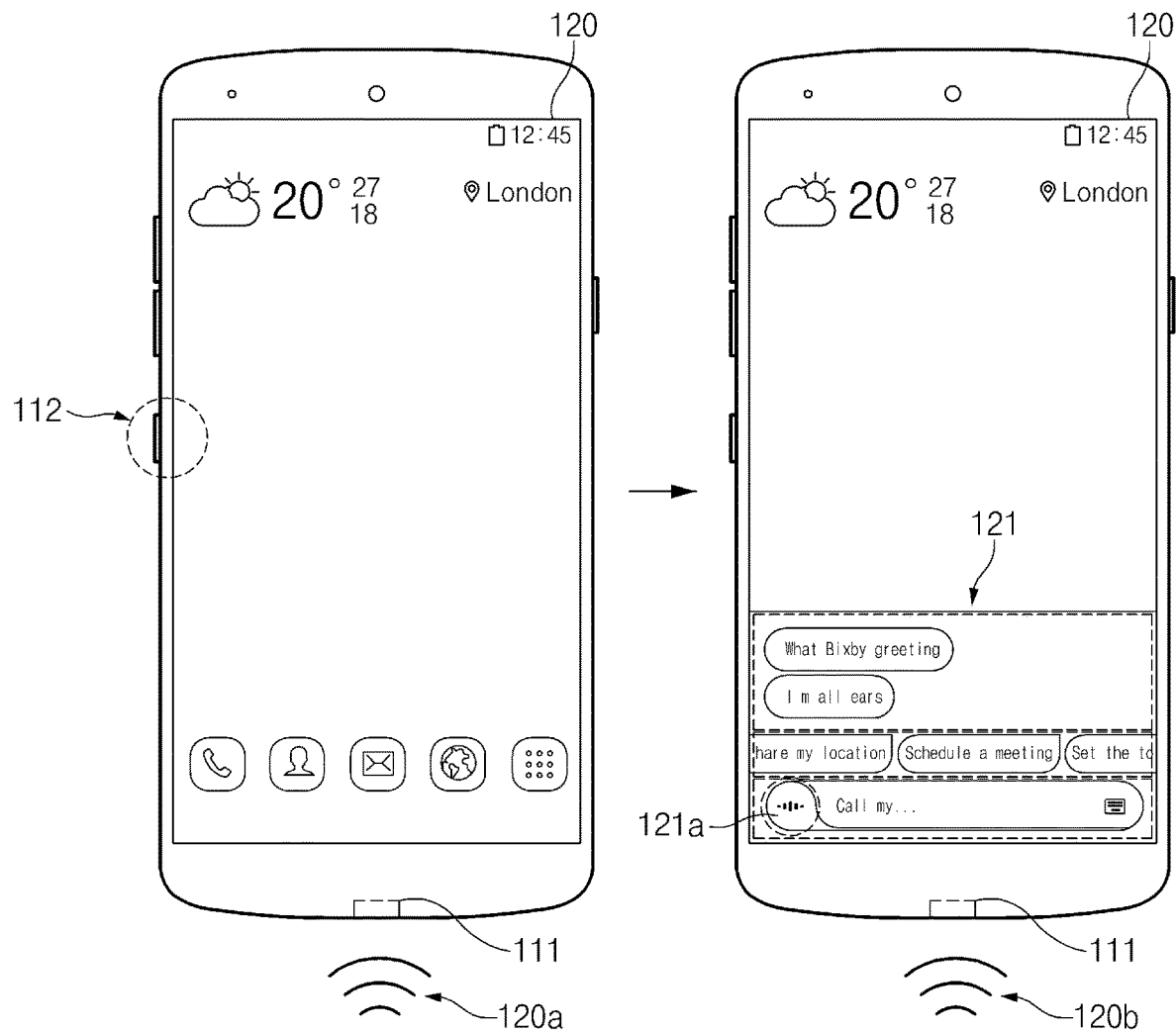
FIG. 1C is a drawing illustrating a form of executing an intelligence app of a user terminal according to an embodiment.

FIG. 1C is a drawing illustrating a form of executing an intelligence app of a user terminal according to an embodiment.

Referring to FIG. 1C, a user terminal 100 of FIG. 1B may include a hardware button 112 which functions as a hardware interface for executing receiving of a user voice input. The hardware button 112 may be disposed in, for example, a region a body (e.g., a finger) of a user easily approach on a housing of the user terminal 100 and may be at least in part exposed to the outside of the housing. In an embodiment, the user terminal 100 may receive a user input provided to the hardware button 112 and may execute an intelligence app (e.g., a speech recognition app) which interworks with an intelligence agent 145 of FIG. 1B.

When receiving a user input through the hardware key 112, the user terminal 100 may display a user interface (UI) 121 of the intelligence app on a display 120. For example, a user may touch a speech recognition button 121*a* included in the UI 121 of the intelligence app to input (120*b*) a voice command in a state where the UI 121 of the intelligence app is displayed on the display 120. For another example, the user may input (120*a*) a voice (e.g., a voice command) while keeping the hardware key 112 pushed.

According to an embodiment, the user terminal 100 may execute an intelligence app through a microphone 111. For example, when a specified voice (e.g., "wake up!" or the like) is input through the microphone 111, the user terminal 100 may display the UI 121 of the intelligence app on the display 120.

Figure 1D:
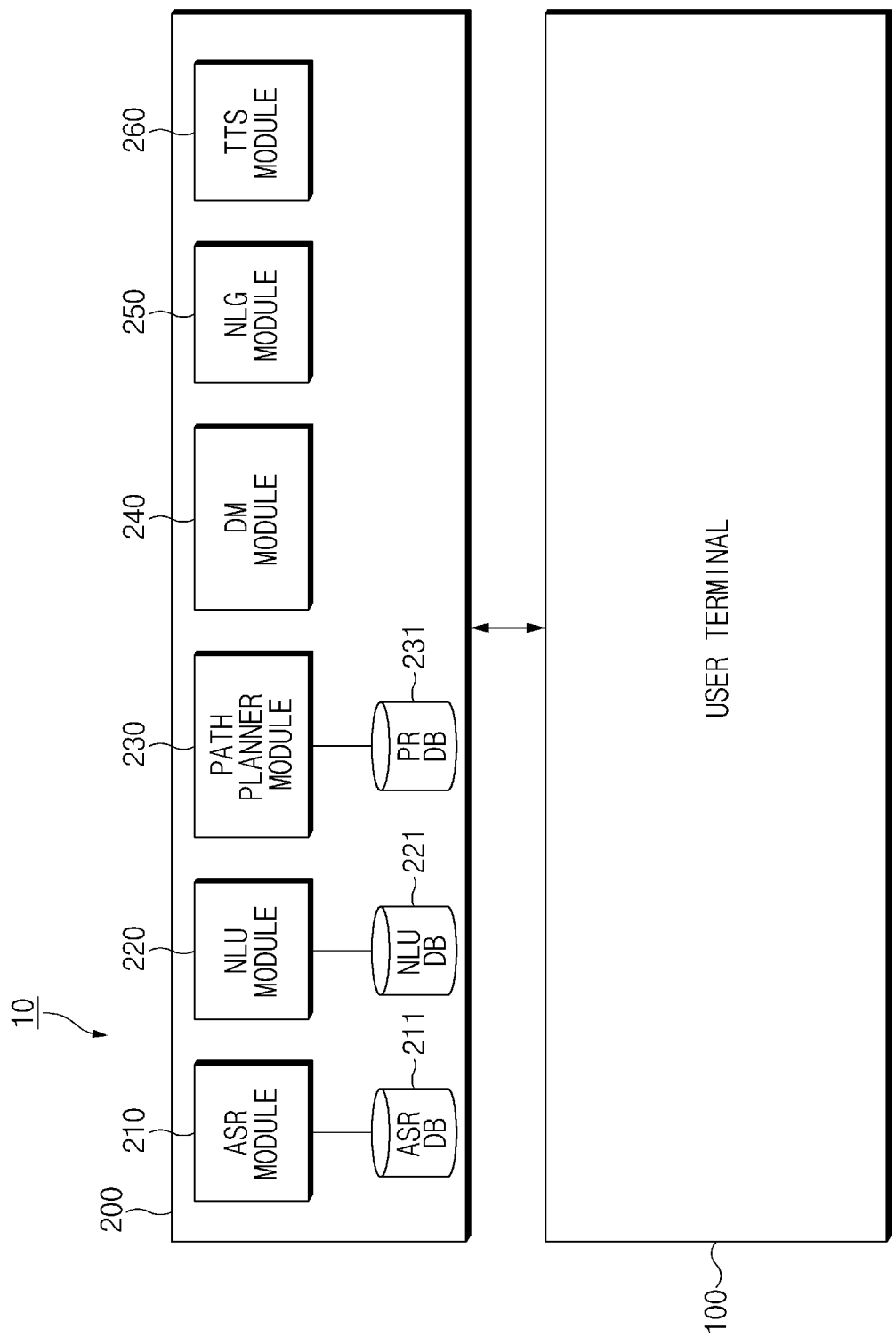
FIG. 1D is a block diagram illustrating an intelligence server of an integrated intelligent system according to an embodiment.

FIG. 1D is a block diagram illustrating an intelligence server of an integrated intelligent system according to an embodiment.

Referring to FIG. 1D, an intelligence server 200 may include an automatic speech recognition (ASR) module 210, a natural language understanding (NLU) module 220, a path planner module 230, a dialogue manager (DM) module 240, a natural language generator (NLG) module 250, or a text to speech (TTS) module 260.

According to an embodiment, the intelligence server 200 may include a communication circuit, a memory, and a processor. The processor may execute instructions stored in the memory to drive the ASR module 210, the NLU module 220, the path planner module 230, the DM module 240, the NLG module 250, and the TTS module 260. The intelligence server 200 may transmit and receive data (or information) with an external electronic device (e.g., a user terminal 100) via the communication circuit.

The NLU module 220 or the path planner module 230 of the intelligence server 200 may generate a path rule.

According to an embodiment, the ASR module 210 may convert a user input received from the user terminal 100 into text data. For example, the ASR module 210 may include an utterance recognition module. The utterance recognition module may include an acoustic model and a language model. For example, the acoustic model may include information associated with vocalization, and the language model may include unit phoneme information and information about a combination of unit phoneme information. The utterance recognition module may convert a user utterance into text data using the information associated with the vocalization and the unit phoneme information. For example, the information about the acoustic model and the language model may be stored in an ASR DB 211.

According to an embodiment, the NLU module 220 may perform a syntactic analysis or a semantic analysis to determine an intent of a user. The syntactic analysis may be used to divide a user input into a syntactic unit (e.g., a word, a phrase, a morpheme, or the like) and determine whether the divided unit has any syntactic element. The semantic analysis may be performed using semantic matching, rule matching, formula matching, or the like. Thus, the NLU module 220 may obtain a domain, intent, or a parameter (or a slot) necessary to express the intent from a user input.

According to an embodiment, the NLU module 220 may determine an intent of the user and a parameter using a matching rule which is divided into a domain, intent, and a parameter (or a slot) necessary to determine the intent. For example, one domain (e.g., an alarm) may include a plurality of intents (e.g., an alarm setting, alarm release, and the like), and one intent may need a plurality of parameters (e.g., a time, the number of iterations, an alarm sound, and the like). A plurality of rules may include, for example, one or more necessary parameters. The matching rule may be stored in a NLU DB 221.

According to an embodiment, the NLU module 220 may determine a meaning of a word extracted from a user input using a linguistic feature (e.g., a syntactic element) such as a morpheme or a phrase and may match the determined meaning of the word to a domain and intent to determine an intent of the user. For example, the NLU module 220 may calculate how many words extracted from a user input are included in each of the domain and the intent, thus determining the intent of the user. According to an embodiment, the NLU module 220 may determine a parameter of the user input using a word which is the basis for determining the intent. According to an embodiment, the NLU module 220 may determine the intent of the user using the NLU DB 221 which stores the linguistic feature for determining the intent of the user input. According to another embodiment, the NLU module 220 may determine the intent of the user using a personal language model (PLM). For example, the NLU module 220 may determine the intent of the user using personalized information (e.g., a contact list or a music list). For example, the PLM may be stored in, for example, the NLU DB 221. According to an embodiment, the ASR module 210 as well as the NLU module 220 may recognize a voice of the user with reference to the PLM stored in the NLU DB 221.

According to an embodiment, the NLU module 220 may generate a path rule based on an intent of a user input and a parameter. For example, the NLU module 220 may select an app to be executed, based on the intent of the user input, and may determine an action to be executed in the selected app. The NLU module 220 may determine a parameter corresponding to the determined action to generate the path rule. According to an embodiment, the path rule generated by the NLU module 220 may include information about an app to be executed, an action (e.g., at least one state) to be executed in the app, and a parameter necessary to execute the action.

According to an embodiment, the NLU module 220 may generate one path rule or a plurality of path rules based on the intent of the user input and the parameter. For example, the NLU module 220 may receive a path rule set corresponding to the user terminal 100 from the path planner module 230 and may map the intent of the user input and the parameter to the received path rule set to determine the path rule.

According to another embodiment, the NLU module 220 may determine an app to be executed, an action to be executed in the app, and a parameter necessary to execute the action, based on the intent of the user input and the parameter to generate one path rule or a plurality of path rules. For example, the NLU module 220 may arrange the app to be executed and the action to be executed in the app in the form of ontology or a graph model depending on the intent of the user input using information of the user terminal 100 to generate the path rule. The generated path rule may be stored in, for example, a path rule database (PR DB) 231 through the path planner module 230. The generated path rule may be added to a path rule set stored in the PR DB 231.

According to an embodiment, the NLU module 220 may select at least one of the plurality of generated path rules. For example, the NLU module 220 may select an optimal path rule among the plurality of path rules. For another example, when some actions are specified based on a user utterance, the NLU module 220 may select the plurality of path rules. The NLU module 220 may determine one of the plurality of path rules depending on an additional input of the user.

According to an embodiment, the NLU module 220 may transmit the path rule to the user terminal 100 in response to a request for a user input. For example, the NLU module 220 may transmit one path rule corresponding to the user input to the user terminal 100. For another example, the NLU module 220 may transmit the plurality of path rules corresponding to the user input to the user terminal 100. For example, when some actions are specified based on a user utterance, the plurality of path rules may be generated by the NLU module 220.

According to an embodiment, the path planner module 230 may select at least one of the plurality of path rules.

According to an embodiment, the path planner module 230 may transmit a path rule set including the plurality of path rules to the NLU module 220. The plurality of path rules included in the path rule set may be stored in the PR DB 231 connected to the path planner module 230 in the form of a table. For example, the path planner module 230 may transmit a path rule set corresponding to information (e.g., operating system (OS) information or app information) of the user terminal 100, received from an intelligence agent 145 of FIG. 1B, to the NLU module 220. A table stored in the PR DB 231 may be stored for, for example, each domain or each version of the domain.

According to an embodiment, the path planner module 230 may select one path rule or a plurality of path rules from a path rule set to transmit the selected one path rule or the plurality of selected path rules to the NLU module 220. For example, the path planner module 230 may match an intent of the user and a parameter to a path rule set corresponding to the user terminal 100 to select one path rule or a plurality of path rules and may transmit the selected one path rule or the plurality of selected path rules to the NLU module 220.

According to an embodiment, the path planner module 230 may generate one path rule or a plurality of path rules using the intent of the user and the parameter. For example, the path planner module 230 may determine an app to be executed and an action to be executed in the app, based on the intent of the user and the parameter to generate the one path rule or the plurality of path rules. According to an embodiment, the path planner module 230 may store the generated path rule in the PR DB 231.

According to an embodiment, the path planner module 230 may store a path rule generated by the NLU module 220 in the PR DB 231. The generated path rule may be added to a path rule set stored in the PR DB 231.

According to an embodiment, the table stored in the PR DB 231 may include a plurality of path rules or a plurality of path rule sets. The plurality of path rules or the plurality of path rule sets may reflect a kind, version, type, or characteristic of a device which performs each path rule.

According to an embodiment, the DM module 240 may determine whether the intent of the user, determined by the NLU module 220, is clear. For example, the DM module 240 may determine whether the intent of the user is clear, based on whether information of a parameter is sufficient. The DM module 240 may determine whether the parameter determined by the NLU module 220 is sufficient to perform a task. According to an embodiment, when the intent of the user is not clear, the DM module 240 may perform feedback for requesting the user to provide necessary information. For example, the DM module 240 may perform feedback for requesting information about a parameter for determining the intent of the user.

According to an embodiment, the DM module 240 may include a content provider module. When the content provider module is able to perform an action based on the intent and parameter determined by the NLU module 220, it may generate the result of performing a task corresponding to a user input. According to an embodiment, the DM module 240 may transmit the result generated by the content provider module as a response to the user input to the user terminal 100.

According to an embodiment, the NLG module 250 may change specified information in the form of text. The information changed in the form of text may be of a form of a natural language utterance. The information changed in the form of text may have a form of a natural language utterance. The specified information may be, for example, information about an additional input, information for providing a notification that an action corresponding to a user input is completed, or information for providing a notification of the additional input of the user (e.g., information about feedback on the user input). The information changed in the form of text may be transmitted to the user terminal 100 to be displayed on a display 120 FIG. 1B or may be transmitted to the TTS module 260 to be changed in the form of a voice.

According to an embodiment, the TTS module 260 may change information of a text form to information of a voice form. The TTS module 260 may receive the information of the text form from the NLG module 250 and may change the information of the text form to the information of the voice form, thus transmitting the information of the voice form to the user terminal 100. The user terminal 100 may output the information of the voice form through a speaker 130 of FIG. 1B.

According to an embodiment, the NLU module 220, the path planner module 230, and the DM module 240 may be implemented as one module. For example, the NLU module 220, the path planner module 230 and the DM module 240 may be implemented as the one module to determine an intent of the user and a parameter and generate a response (e.g., a path rule) corresponding to the determined intent of the user and the determined parameter. Thus, the generated response may be transmitted to the user terminal 100.

Figure 1E:
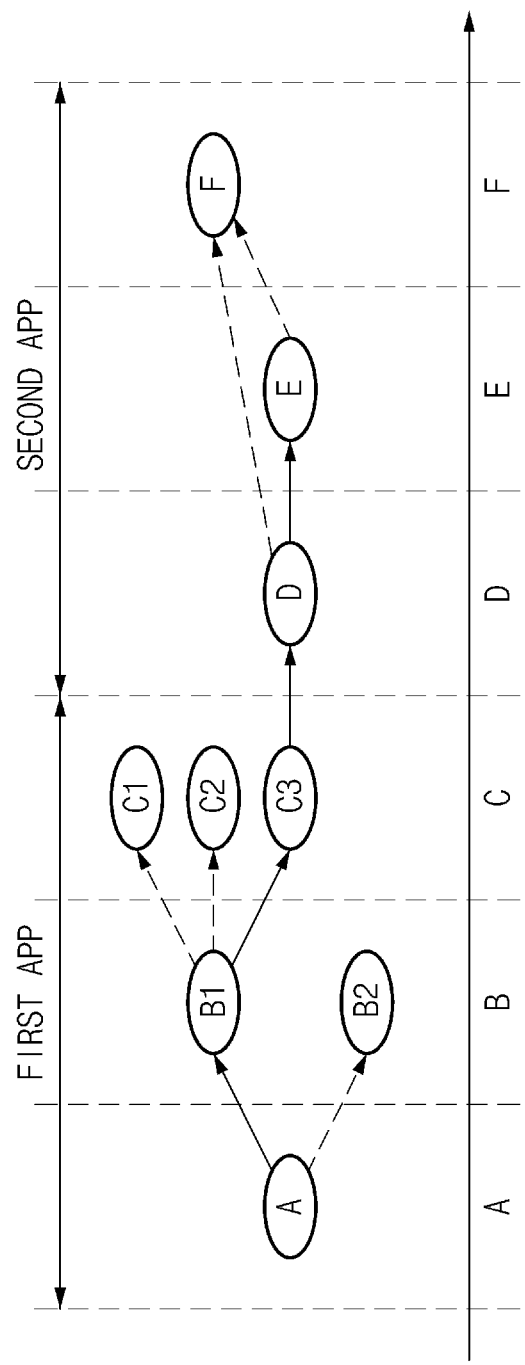
FIG. 1E is a drawing illustrating a form of generating a path rule at an intelligence server according to an embodiment.

FIG. 1E is a drawing illustrating a form of generating a path rule at an intelligence server according to an embodiment.

Referring to FIG. 1E, according to an embodiment, an NLU module 220 of FIG. 1D may classify a function of an app as any one of actions (e.g., state A to state F) and may store the divided action in a PR DB 231 of FIG. 1D. For example, the NLU module 220 may store a path rule set, including a plurality of path rules (e.g., A-B1-C1, A-B1-C2, A-B1-C3-D-F, and A-B1-C3-D-E-F) classified as one action (e.g., state), in the PR DB 231.

According to an embodiment, the PR DB 231 of a path planner module 230 of FIG. 1D may store a path rule set for performing the function of the app. The path rule set may include a plurality of path rules, each of which includes a plurality of actions (e.g., a sequence of states). An action executed depending on a parameter input to each of the plurality of actions may be sequentially arranged in the plurality of path rules. According to an embodiment, the plurality of path rules may be configured in the form of ontology or a graph model to be stored in the PR DB 231.

According to an embodiment, the NLU module 220 may select an optimal path rule (e.g., A-B1-C3-D-F) among the plurality of path rules (e.g., A-B1-C1, A-B1-C2, A-B1-C3-D-F, and A-B1-C3-D-E-F) corresponding to an intent of a user input and a parameter.

According to an embodiment, when there is no path rule completely matched to a user input, the NLU module 220 may transmit a plurality of path rules to a user terminal 100 of FIG. 1D. For example, the NLU module 220 may select a path rule (e.g., A-B1) partially corresponding to the user input. The NLU module 220 may select one or more path rules (e.g., A-B1-C1, A-B1-C2, A-B1-C3-D-F, and A-B1-C3-D-E-F) including the path rule (e.g., A-B1) partially corresponding to the user input and may transmit the one or more path rules to the user terminal 100.

According to an embodiment, the NLU module 220 may select one of the plurality of path rules based on an additional input of the user terminal 100 and may transmit the selected one path rule to the user terminal 100. For example, the NLU module 220 may select one (e.g., A-B1-C3-D-F) of the plurality of path rules (e.g., A-B1-C1, A-B1-C2, A-B1-C3-D-F, and A-B1-C3-D-E-F) depending on a user input (e.g., an input for selecting C3) additionally input to the user terminal 100, thus transmitting the selected one path rule to the user terminal 100.

According to another embodiment, the NLU module 220 may determine an intent of the user and a parameter corresponding to the user input (e.g., the input for selecting C3) additionally input to the user terminal 100 via the NLU module 220, thus transmitting the determined intent of the user or the determined parameter to the user terminal 100. The user terminal 100 may select one (e.g., A-B1-C3-D-F) of the plurality of path rules (e.g., A-B1-C1, A-B1-C2, A-B1-C3-D-F, and A-B1-C3-D-E-F) based on the transmitted intent or parameter.

Thus, the user terminal 100 may complete the actions of apps 141 and 143 of FIG. 1B based on the selected one path rule.

According to an embodiment, when a user input, information of which is insufficient, is received at an intelligence server 200 of FIG. 1D, the NLU module 220 may generate a path rule partially corresponding to the received user input. For example, the NLU module 220 may transmit the partially corresponding path rule to an intelligence agent 145 of FIG. 1B. A processor 150 of FIG. 1B may execute the intelligence agent 145 to receive the path rule and transmit the partially corresponding path rule to an execution manager module 147 of FIG. 1B. The processor 150 may execute the first app 141 depending on the path rule using the execution manager module 147. The processor 150 may transmit information about an insufficient parameter to the intelligence agent 145 while executing the first app 141 using the execution manager module 147. The processor 150 may request a user to provide an additional input using the information about the insufficient parameter through the intelligence agent 145. When the additional input is received by the user, the processor 150 may transmit the additional input to the intelligence server 200 through the intelligence agent 145. The NLU module 220 may generate an added path rule based on information about an intent of the user input which is additionally input and a parameter and may transmit the generated path rule to the intelligence agent 145. The processor 150 may transmit the path rule to the execution manager module 147 through the intelligence agent 145 to execute the second app 143.

According to an embodiment, when a user input, some information of which is missed, is received at the intelligence server 200, the NLU module 220 may transmit a user information request to a personal information server 300 of FIG. 1B. The personal information server 300 may transmit information about the user who inputs a user input stored in a persona DB to the NLU module 220. The NLU module 220 may select a path rule corresponding to the user input, some actions of which are missed, using the user information. Thus, even though the user input, some information of which is missed, is received at the intelligence server 200, the NLU module 220 may request the user to provide the missed information to receive an additional input or may determine a path rule corresponding to the user input using the user information.

Table 1 below may indicate an example form of a path rule associated with a task requested by the user according to an embodiment.

TABLE 1

| Path rule ID | State | Parameter |
| --- | --- | --- |
| Gallery_101 | PicturesView(25) | NULL |
|  | SearchView(26) | NULL |
|  | SearchViewResult(27) | Location, time |
|  | SearchEmptySelectedView(28) | NULL |
|  | SearchSelectedView(29) | ContentType, selectall |
|  | CrossShare(30) | anaphora |

Referring to Table 1, a path rule generated or selected by an intelligence server (e.g., an intelligence server 200 of FIG. 1A) depending on a user utterance (e.g., "Please share your photo with me") may include at least one state 25, 26, 27, 28, 29, or 30. For example, the at least one state (e.g., one action state of a user terminal 100 of FIG. 1A) may correspond to at least one of PicturesView 25, SearchView 26, SearchViewResult 27, SearchEmptySelectedView 28, SearchSelectedView 29, or CrossShare 30.

In an embodiment, information about a parameter of the path rule may correspond to at least one state. For example, the information about the parameter of the path rule may be included in SearchSelectedView 29.

A task (e.g., "Please share your photo with me!") requested by a user may be performed as a result of performing a path rule including a sequence of the states 25 to 29.

Figure 1F:
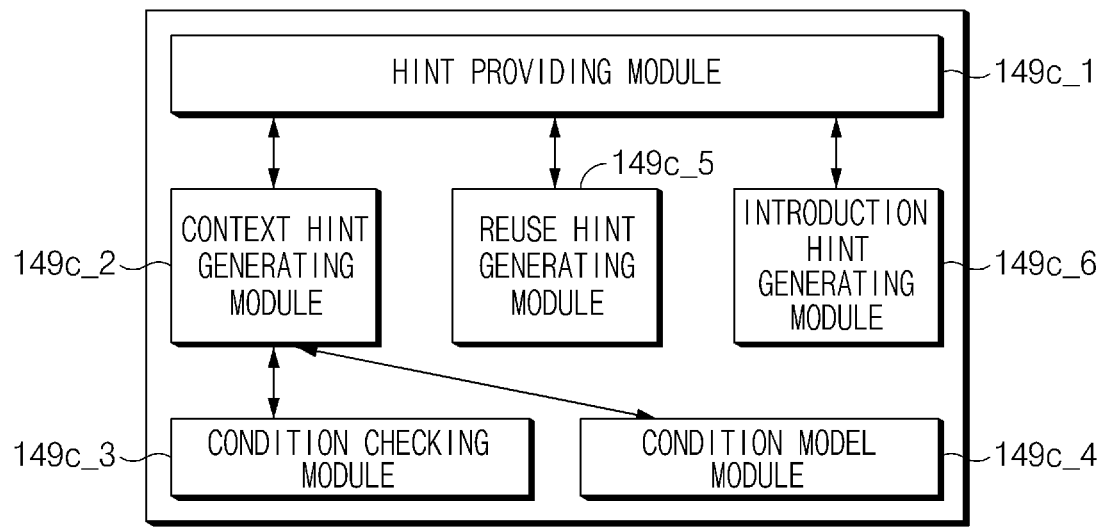
FIG. 1F is a block diagram illustrating a proposal module of an intelligence service module according to an embodiment.

FIG. 1F is a block diagram illustrating a proposal module of an intelligence service module according to an embodiment.

Referring to FIG. 1F, a proposal module 149c may include a hint providing module 149c_1, a context hint generating module 149c_2, a condition checking module 149c_3, a condition model module 149c_4, and a reuse hint generating module 149c_5, or an introduction hint generating module 149c_6.

According to an embodiment, the processor 150 of FIG. 1B may execute the hint providing module 149c_1 to provide a hint to a user. For example, the processor 150 may receive a hint generated from the context hint generating module 149c_2, the reuse hint generating module 149c5, or the introduction hint generating module 149c_6 and may provide the hint to the user, through the hint providing module 149c_1.

According to an embodiment, the processor 150 may execute the condition checking module 149c_3 or the condition model module 149c_4 to generate a hint capable of being recommended according to a current state. The processor 150 may execute the condition checking module 149c_3 to receive information corresponding to a current state and may execute the condition model module 149c_4 to set a condition model using the received information. For example, the processor 150 may execute the condition model module 149c_4 to determine a time when a hint is provided to the user, a location where the hint is provided to the user, a situation where the hint is provided to the user, an app which is in use when the hint is provided to the user, and the like and provide a hint with a high possibility of being used in a corresponding condition to the user in order of priority.

According to an embodiment, the processor 150 may execute the reuse hint generating module 149c_5 to generate a hint capable of being recommended based on a frequency of use. For example, processor 150 may execute the reuse hint generating module 149c_5 to generate the hint based on a usage pattern of the user.

According to an embodiment, the introduction hint generating module 149c_6 may generate a hint of introducing a new function or a function frequently used by another user to the user. For example, the hint of introducing the new function may include introduction (e.g., an operation method) of an intelligence agent 145 of FIG. 1B.

According to another embodiment, the context hint generating module 149c_2, the condition checking module 149c3, the condition model module 149c4, the reuse hint generating module 149c5, or the introduction hint generating module 149c_6 of the proposal module 149c may be included in a personal information server 300 of FIG. 1B. For example, the processor 150 may receive a hint from the context hint generating module 149c2, the reuse hint generating module 149c_5, or the introduction hint generating module 149c_6 of the personal information server 300 and may provide the received hint to the user, through the hint providing module 149c_1 of the proposal module 149c.

According to an embodiment, a user terminal 100 of FIG. 1B may provide a hint depending on the following series of processes. For example, when receiving a hint providing request from the intelligence agent 145, the processor 150 may transmit the hint generation request to the context hint generating module 149c_2 through the hint providing module 149c_1. When receiving the hint generation request, the processor 150 may receive information corresponding to a current state from a context module 149a and a persona module 149b of FIG. 1B using the condition checking module 149c_3. The processor 150 may transmit the received information to the condition model module 149c_4 through the condition checking module 149c_3 and may assign a priority to a hint in an order of a high possibility of being used in the condition among hints provided to the user using the information through the condition model module 149c_4. The processor 150 may verify the condition using the context hint generating module 149c_2 and may generate a hint corresponding to the current state. The processor 150 may transmit the generated hint to the hint providing module 149c_1 through the context hint generating module 149c_2. The processor 150 may arrange the hint depending on a specified rule and may transmit the hint to the intelligence agent 145, using the hint providing module 149c_1.

According to an embodiment, the processor 150 may generate a plurality of context hints and may prioritize the plurality of context hints depending on a specified rule, using the hint providing module 149c_1. According to an embodiment, the processor 150 may first provide a hint with a higher priority among the plurality of context hints to the user through the hint providing module 149c_1.

According to an embodiment, the user terminal 100 may propose a hint according to a frequency of use. For example, when receiving a hint providing request from the intelligence agent 145, the processor 150 may transmit a hint generation request to the reuse hint generating module 149c_5 through the hint providing module 149c_1. When receiving the hint generation request, the processor 150 may receive user information from the persona module 149b through the reuse hint generating module 149c_5. For example, the processor 150 may receive a path rule included in preference information of the user, stored in the persona module 149b, a parameter included in the path rule, a frequency of execution of an app, and space-time information used by the app, through the reuse hint generating module 149c_5. The processor 150 may generate a hint corresponding to the received user information using the reuse hint generating module 149c_5. The processor 150 may transmit the generated hint to the hint providing module 149c_1 through the reuse hint generating module 149c_5. The processor 150 may arrange the hint and may transmit the hint to the intelligence agent 145, using the hint providing module 149c_1.

According to an embodiment, the user terminal 100 may propose a hint for a new function. For example, when receiving a hint providing request from the intelligence agent 145, the processor 150 may transmit a hint generation request to the introduction hint generating module 149c_6 through the hint providing module 149c_1. The processor 150 may transmit an introduction hint providing request to a proposal server 400 of FIG. 1B and may receive information about a function to be introduced from the proposal server 400, through the introduction hint generating module 149c_6. For example, the proposal server 400 may store, for example, information about a function to be introduced. A hint list of the function to be introduced may be updated by a service operator. The processor 150 may transmit the generated hint to the hint providing module 149c_1 through the introduction hint generating module 149c_6. The processor 150 may arrange the hint and may transmit the hint to the intelligence agent 145, through the hint providing module 149c_1.

Thus, the processor 150 may provide the hint generated by the context hint generating module 149c_2, the reuse hint generating module 149c_5, or the introduction hint generating module 149c_6 to the user through the proposal module 149c. For example, the processor 150 may display the generated hint on an app of operating the intelligence agent 145 and may receive an input for selecting the hint from the user through the app, through the proposal module 149c.

Figure 2:
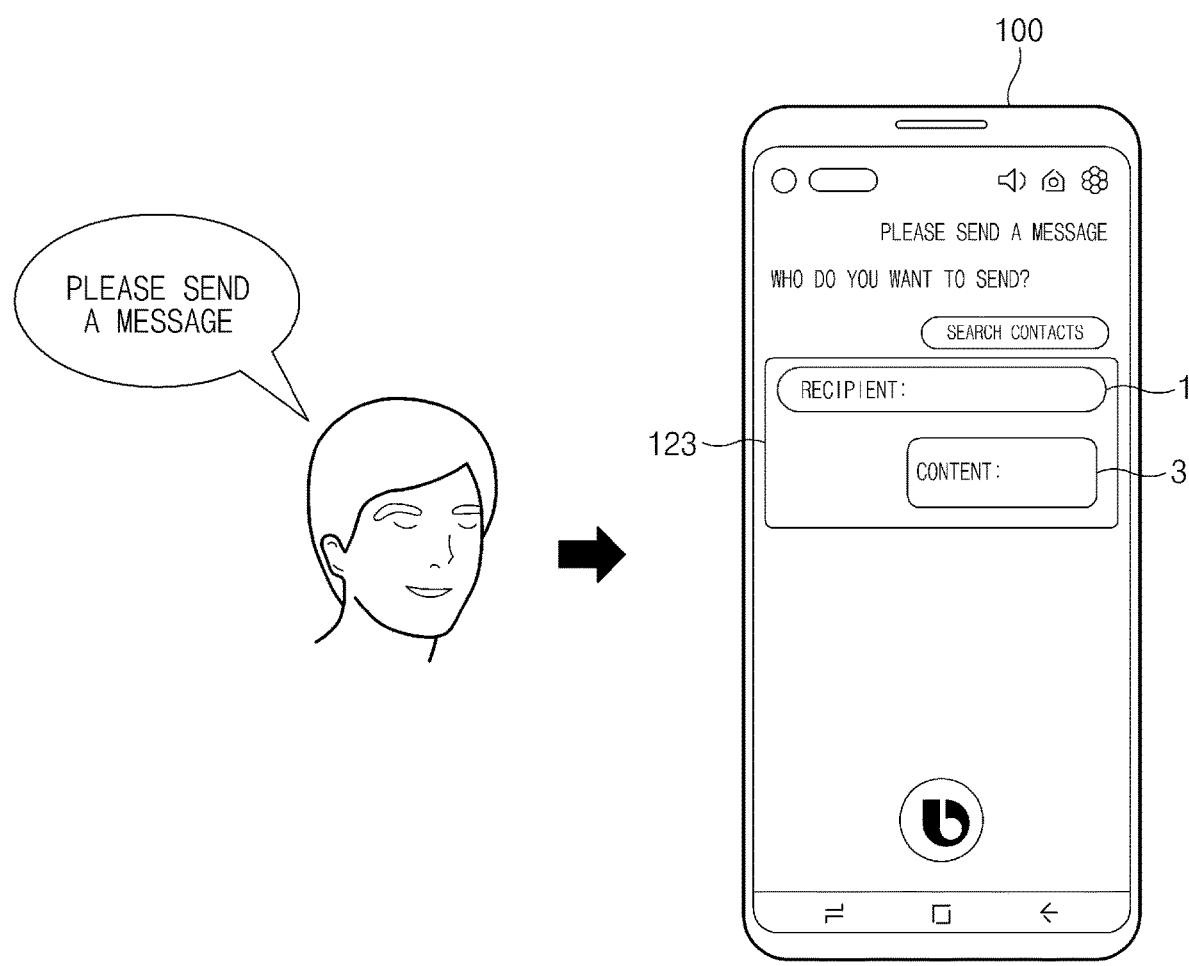
FIG. 2 is a drawing illustrating an example of operating a speech recognition service of a user terminal according to an embodiment.

FIG. 2 is a drawing illustrating an example of operating a speech recognition service of a user terminal according to an embodiment.

As described above, a user terminal 100 of FIG. 1B may receive a user input (e.g., a voice input) according to a user utterance (e.g., a voice command requesting performance of a specific task by the user terminal 100) containing a specific command or user intention, and may transmit the received user input to an external device, such as the intelligence server 200 of FIG. 1D. An NLU module 220 of the intelligence server 200 may extract an intent of a user utterance associated with the user input using a matching rule configured with a domain, intent, and a parameter. The NLU module 220 may select an application program to perform a task in the user terminal 100 based on the extracted intent of the user and may generate a path rule for actions (or states) of the user terminal 100, which is incidental to performing the task. In the above-mentioned process, when the user utterance is simplified, parameter information required for the user terminal 100 to perform actions according to a path rule may be omitted on the user utterance. As such, when the parameter information is omitted on the user utterance or when valid parameter information is insufficient, the performance of a task of the user terminal 100, corresponding to an intent of a user utterance, may fail to be normally completed. In various embodiments of the present disclosure hereinafter, a user utterance, parameter information, required to perform a path rule or a task according to the path rule, of which is omitted, may be referred to as an incomplete utterance.

According to an embodiment, in an operation of deriving the intent of the user utterance, the NLU module 220 may identify omission of parameter information on a user input according to the incomplete utterance. The NLU module 220 may transmit execution type information about a path rule together with the path rule generated in response to the derived intent of the user utterance to the user terminal 100. Alternatively, the NLU module 220 may transmit information about at least one action, parameter information of which is omitted, among the actions of the user terminal 100, configuring the generated path rule, to the user terminal 100. The execution type information may be referred to as sequence information selected (or specified) by the NLU module 220 and will be described through a description of a specific element (e.g., a target parameter filling (TPF) module 160 of FIG. 3) of the user terminal 100, which will be described below.

Referring to FIG. 2 in connection with the above-mentioned contents, the user terminal 100 may receive an incomplete utterance "please send a message" from a user. The incomplete utterance may be understood as a state where some parameter information (e.g., a message recipient and message content) required for the user terminal 100 to perform a task (e.g., message transmission) is omitted.

According to an embodiment, as receiving the incomplete utterance, the user terminal 100 may receive execution type information of a path rule together with the path rule corresponding to the incomplete utterance (e.g., a path rule, parameter information, associated with performing at least some of actions of the user terminal 100, of which is omitted in the at least some of the actions of the user terminal 100, configuring the path rule). The user terminal 100 may output a graphic user interface (GUI) 123 for receiving parameter information (e.g., parameter information omitted on the incomplete utterance) required to perform the path rule from the user with reference to the execution type information. In various embodiments of the present disclosure, since a user utterance is incomplete, as parameter information required to perform a task is omitted on the user utterance, a state where the GUI 123 associated with requesting the omitted parameter information is output may be referred to as a TPF state.

According to an embodiment, the GUI 123 may be output on a screen where an intelligence app is executed or may be output through execution of an application program associated with a specific element of the user terminal 100 (e.g., a TPF module 160 of FIG. 3 described below), which generates the GUI 123. Alternatively, the GUI 123 may be output in the form of, for example, a widget on any screen (e.g., a home screen) output on the user terminal 100.

In an embodiment, the GUI 123 may be generated in connection with an application program corresponding to a derived user utterance among at least one application program loaded or installed in the user terminal 100. For example, the GUI 123 may include a field (e.g., a message recipient field 1 and a message content field 3) in which at least one parameter information required for an application program corresponding to the user utterance to perform a task (or a path rule associated with performing the task) is able to be entered. Herein, a frame of the GUI 123 except for the fields 1 and 3 may be used for at least one application program included in the user terminal 100.

Hereinafter, a description will be given of various embodiments about operation of a GUI according to the above-mentioned incomplete utterance and operations of elements of the user terminal 100 associated with the various embodiments.

Figure 3:
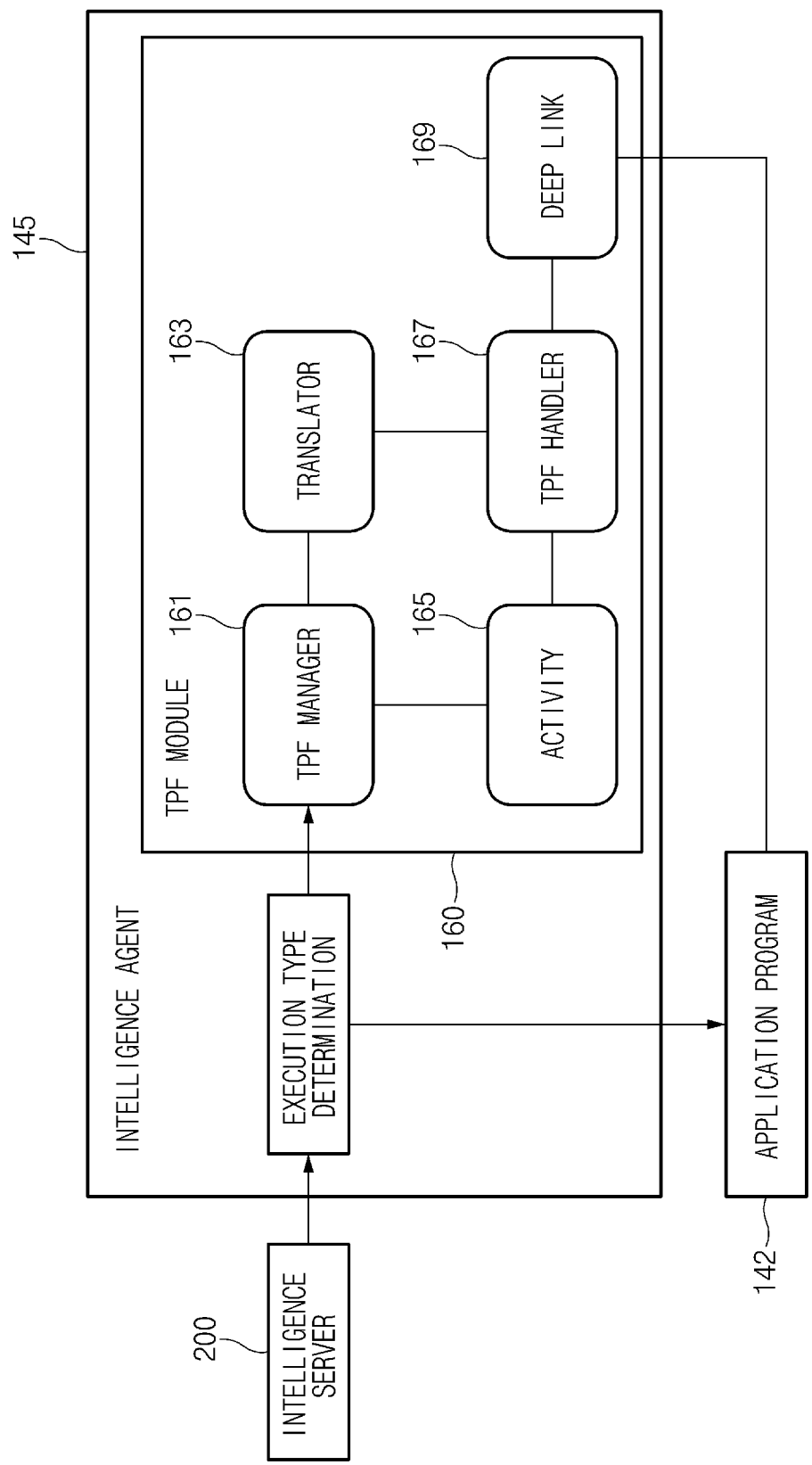
FIG. 3 is a block diagram illustrating an intelligence agent according to an embodiment.
Figure 4:
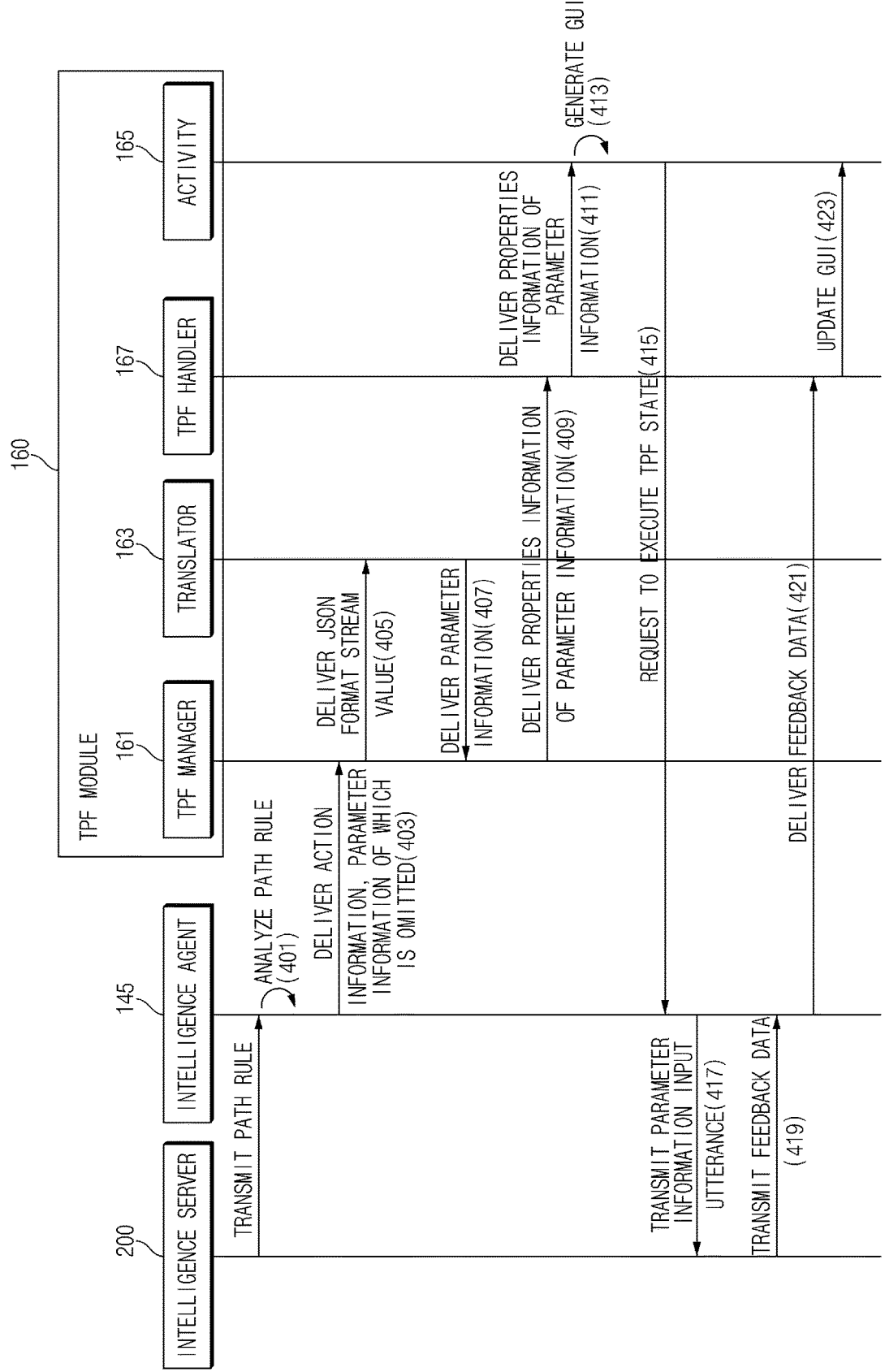
FIG. 4 is a signal sequence diagram illustrating an operation process of an intelligence agent for an incomplete utterance according to an embodiment.

FIG. 3 is a block diagram illustrating an intelligence agent according to an embodiment. FIG. 4 is a signal sequence diagram illustrating an operation process of an intelligence agent for an incomplete utterance according to an embodiment.

Referring to FIG. 3, an intelligence agent 145 of a user terminal 100 (e.g., as seen in FIG. 1B) may determine a transmission path of a path rule with reference to the path rule received from an intelligence server 200 depending on occurrence of a user utterance. For example, when execution type information is included in a path rule received from the intelligence server 200 depending on an incomplete utterance of a user, the intelligence agent 145 may deliver information about an action, parameter information of which is omitted, among actions (or states) of the user terminal 100, configuring the path rule to a TPF module 160. In an embodiment, the execution type information may be information referenced by a function which should be performed by the TPF module 160 upon occurrence of an incomplete utterance. For example, in case of the above-mentioned incomplete utterance "please send a message", an NLU module 220 of FIG. 1D may include execution type information in the form of TPF_SEND_MESSAGE in a path rule generated in response to the incomplete utterance. When the execution type information is not included in the path rule received from the intelligence server 200, the intelligence agent 145 may deliver the path rule to an application program 142 associated with the path rule. In various embodiments, the execution type information may be specified (or selected) by the intelligence server 200 in the form of TPF_SEND_MESSAGE, TPF_SEND_EMAIL, TPF_CREATE_EVENT, TPF_CREATE_TASK, TPF_MAKE_CALL, TPF_MAKE_CALL_VIDEO, TPF_FIND_CONTACT, TPF_CREATE_REMINDER, TPF_SET_ALARM, TPF_EDIT_ALARM, or the like, depending on various intents capable of being derived from an incomplete utterance or various types of application programs capable of being associated with the incomplete utterance. Thus, the path including the execution type information may be understood as a path rule specified (or selected) independently of another path rule.

In an embodiment, the TPF module 160 may generate a GUI 123 (such as that seen in FIG. 2) based on an analysis of the action, the parameter information of which is omitted, transmitted from the intelligence agent 145. In this regard, the TPF module 160 may include a TPF manager 161, a translator 163, an activity 165, a TPF handler 167, or a deep link 169. In various embodiments, the above-mentioned elements (e.g., the TPF manager 161, the translator 163, the activity 165, or the TPF handler 167) of the TPF module 160 may be implemented independently of each other, or the TPF module 160 may include a module or engine in which at least some of the elements of the TPF module 160 are integrated with each other.

The TPF manager 161 may interact with the intelligence agent 145 to obtain information about an action, parameter information of which is omitted, among available actions of the user terminal 100, configuring a path rule. The translator 163 may obtain the omitted parameter information from an application program associated with the incomplete utterance. Alternatively, the translator 163 may obtain all parameter information necessary to perform a task according to the incomplete utterance from the application program. The TPF handler 167 may perform overall control for a GUI (e.g., control to generate or update the GUI). The activity 165 may generate a GUI in response to a request of the TPF handler 167. The deep link 169 may function as a hyperlink capable of accessing at least one application program loaded or installed in the user terminal 100.

According to a function action of each of the intelligence agent 145 and the TPF module 160, in operation 401, the intelligence agent 145 may receive and analyze a path rule according to an incomplete utterance (e.g., "please send a message that I will arrive in five minutes," which lacks a subject/recipient) received from the intelligence server 200. For example, the intelligence agent 145 may determine whether execution type information is included in the path rule and may identify at least one action, parameter information of which is omitted, among actions of the user terminal 100, configuring the path rule.

In operation 403, the intelligence agent 145 may deliver identification information for the at least one action, the parameter information of which is omitted, (e.g., a state identifier (ID) of the user terminal 100 associated with performing the action, hereinafter referred to as "state ID") to the TPF manager 161 in the TPF module 160. In operation 405, the TPF manager 161 may deliver a javascript object notation (JSON) format string value corresponding to the transmitted identification information to the translator 163. In an embodiment, the JSON format string value may include a path rule ID associated with the at least one action, the parameter information of which is omitted, and information about the state ID.

In operation 407, the translator 163 may deliver at least one parameter information, required to perform a path rule according to the incomplete utterance, as a response to the reception of the JSON format string value to the TPF manager 161. In this regard, the translator 163 may identify a related application program based on the JSON format string value and may access the identified application program to obtain parameter information (e.g., a message recipient (key: name, type: string, value: recipient's name)) required to perform a path rule according to the incomplete utterance.

TABLE 2

| List<Param> | | | |
|---|---|---|---|
| key: Content<br>type: String<br>value: null | key: Number<br>type: String<br>value: 010-XXXX-XXXX | key: Date<br>type: Date<br>value: null | key: Time<br>type: Time<br>value: 13:30 | . . . |

Table 2 may indicate an example form of parameter information according to an embodiment. In various embodiments, the parameter information obtained from the identified application program by the translator 163 may include an intent of an incomplete utterance or information, such as content, a phone number, a date, or a time, according to a path rule or a task associated with the incomplete utterance, other than the message recipient.

In operation 409, the TPF manager 161 may deliver properties information (e.g., key: name) about the transmitted parameter information to the TPF handler 167. In operation 411, the TFP handler 167 may deliver the properties information about the parameter information to the activity 165 to request to generate a GUI.

In operation 413, the activity 165 may generate a GUI including a field (e.g., a message recipient field) for requesting parameter information omitted on the incomplete utterance, based on the properties information about the parameter information.

In operation 415, the activity 165 may request the intelligence agent 145 to execute a TPF state associated with outputting the generated GUI. Thus, a processor 150 of the user terminal 100 may obtain data about a GUI from the activity and may output the obtained data on a display 120 of FIG. 1B.

In operations 417 and 419, the intelligence agent 145 may receive a parameter information input utterance (e.g., Hong Kildong) of the user, which occurs in response to the output of the GUI, to transmit the received parameter information input utterance to the intelligence server 200 and may receive feedback data (e.g., text data) in which voice data according to the parameter information input utterance is converted into a text format, from the intelligence server 200.

In operation 421, the intelligence agent 145 may deliver the feedback data, received from the intelligence server 200, to the TPF handler 167. In operation 423, the TPF handler 167 may request the activity 165 to display the feedback data on a field (e.g., a message recipient field) included in a GUI.

In an embodiment, according to the above-mentioned process, when all of at least one parameter information in the form of text, respectively corresponding to at least one field included in the GUI, is displayed, the TPF handler 167 may deliver information about the parameter information to the intelligence agent 145. The intelligence agent 145 may request the intelligence server 200 to generate feedback (e.g., feedback in the form of a voice or text) for requesting the user to identify parameter information displayed on the GUI and may receive and output the feedback. When a response associated with approval occurs from the user, the intelligence agent 145 may deliver information about the response to the TPF handler 167. The TPF handler 167 may deliver parameter information additionally input from the user to the identified application program through the deep link 169 of FIG. 3.

Figure 5:
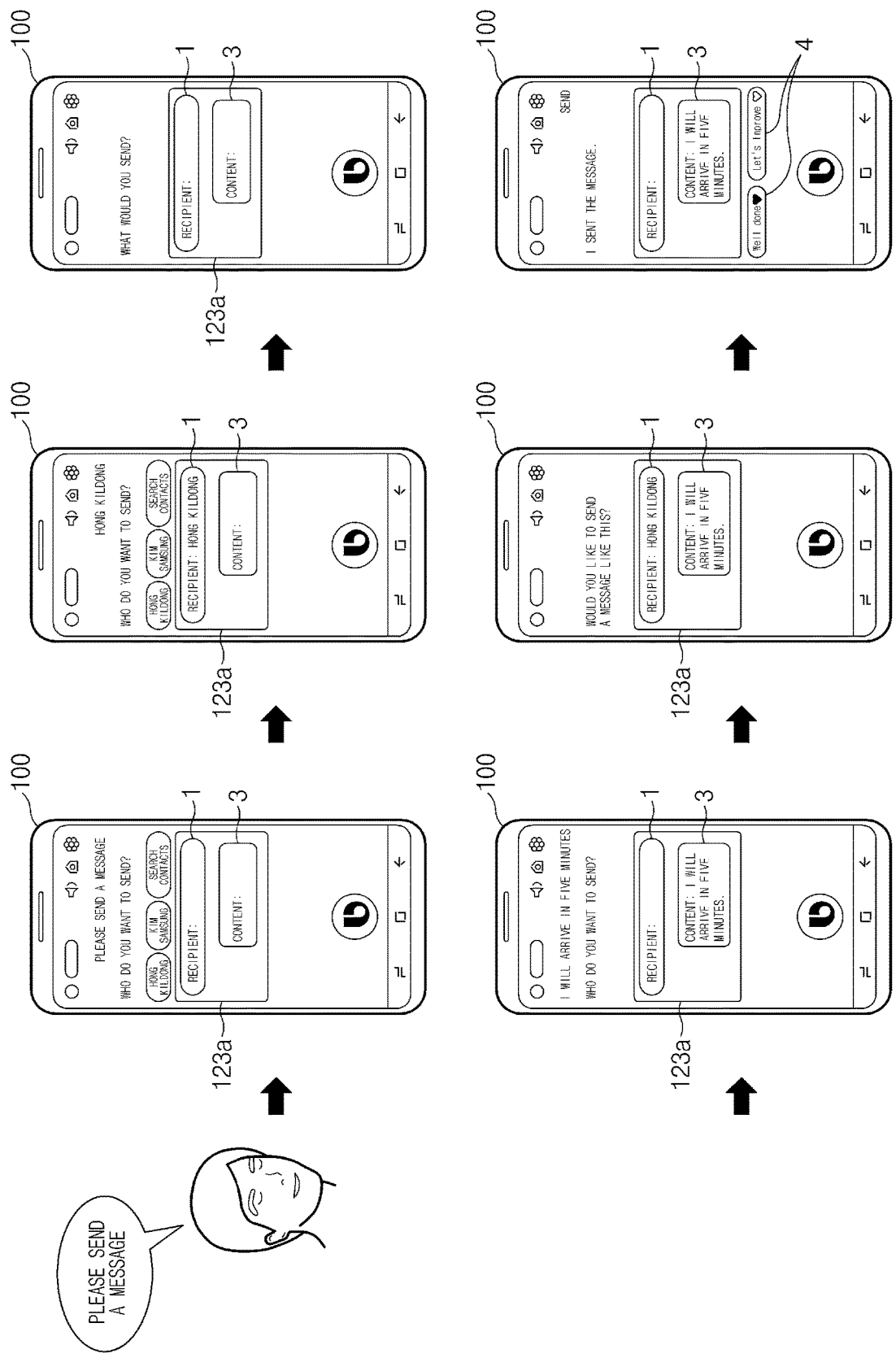
FIG. 5 is a drawing illustrating a first processing form of a user terminal for an incomplete utterance according to an embodiment.
Figure 6:
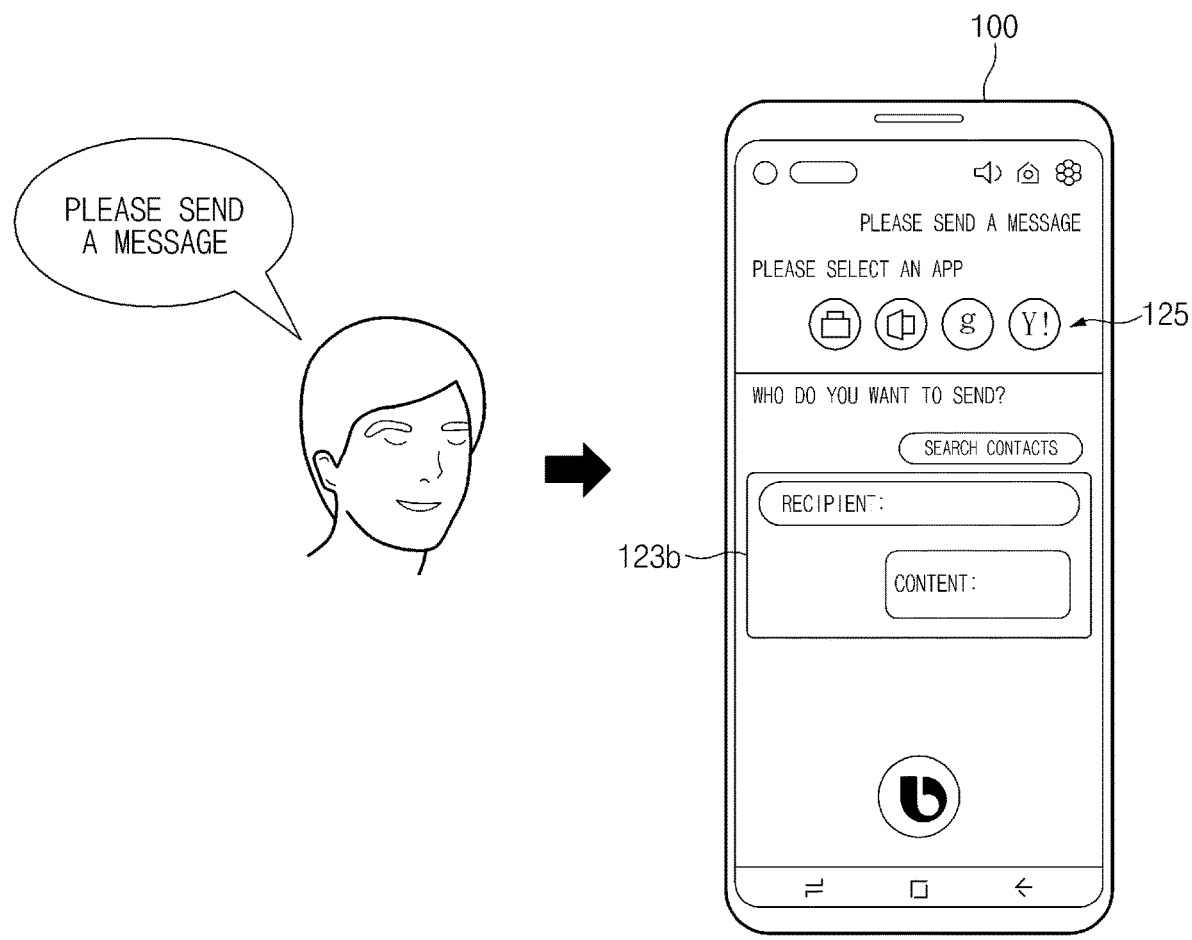
FIG. 6 is a drawing illustrating a second processing form of a user terminal for an incomplete utterance according to an embodiment.
Figure 7:
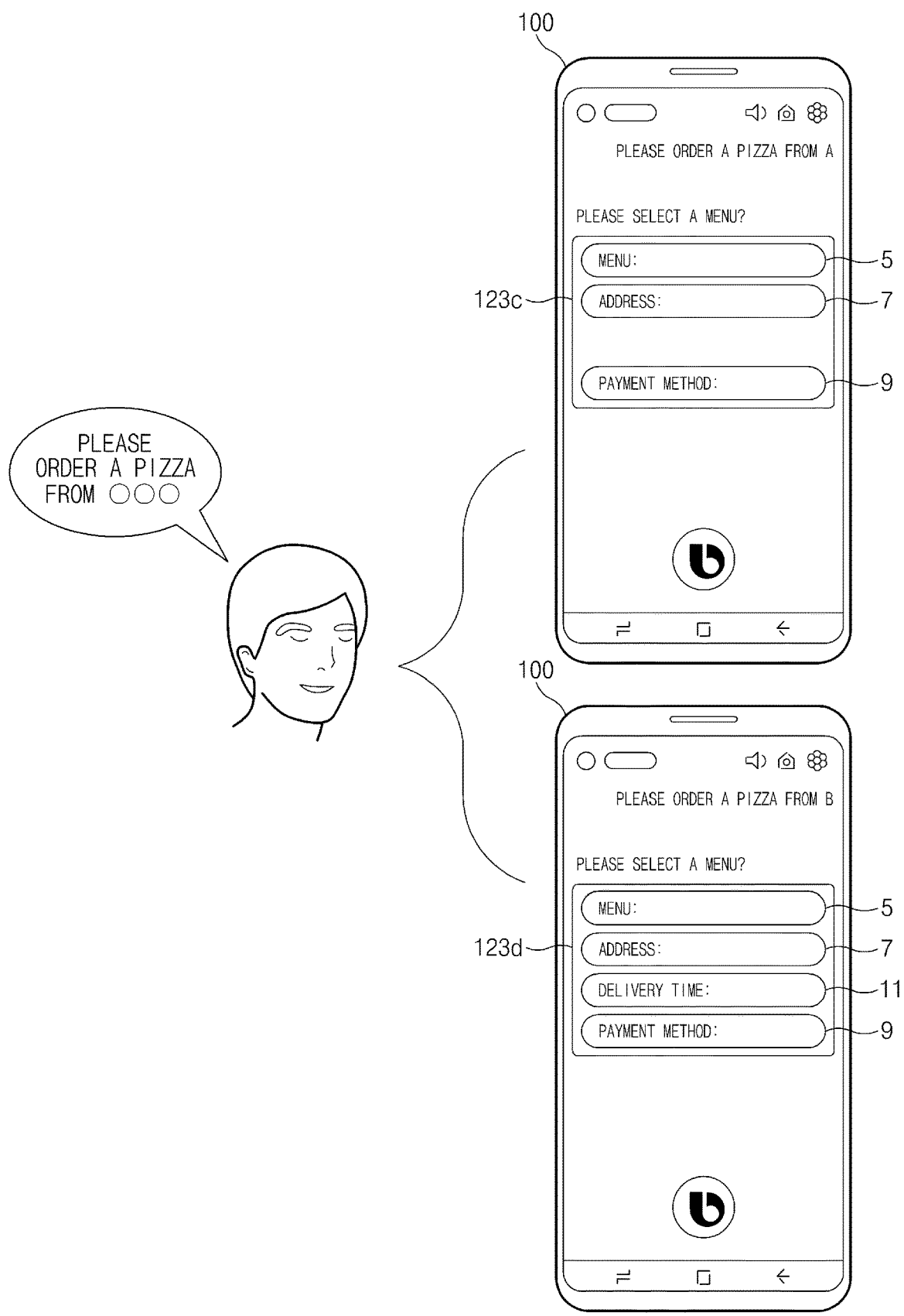
FIG. 7 is a drawing illustrating a third processing form of a user terminal for an incomplete utterance according to an embodiment.

FIGS. 5 to 7 are drawings illustrating various processing forms of a user terminal for an incomplete utterance according to an embodiment.

In an embodiment, a user may provide a specified user input (e.g., a press, a press and hold, or the like) to a hardware key 112 of FIG. 1C, provided in one region of a user terminal 100 of FIG. 1B in connection with operation of a speech recognition service. In this case, an intelligence agent 145 of FIG. 1B, which supports the operation of the speech recognition service, may be activated, and an intelligence app may be triggered according to the activation of the intelligence agent 145 to be executed. Alternatively, when receiving a specified wake-up utterance (e.g., "Hi, Galaxy", "Hi, Bixby" or the like) from the user through a microphone 111 of FIG. 1C, the user terminal 100 may execute an intelligence app. The executed intelligence app may be changed to a listening state of waiting for receiving a user utterance.

Referring to FIG. 5, according to the execution of the intelligence app, the user may perform a user utterance (e.g., stating "Please send a message") which includes a specific command and/or intent associated with an executable task (e.g., in this case, the function requested would be message transmission) to be performed by the user terminal 100. As described above, the user utterance may be understood as an incomplete utterance, such as the case when necessary parameter for executing the task (e.g., such as identifying a message recipient and defining message content) are omitted by the user.

The intelligence agent 145 may transmit the recorded voice data corresponding to the incomplete utterance to an intelligence server 200 of FIG. 1D. The intelligence server 200 may generate a path rule based on recognition of an incomplete utterance (or the voice data), and may transmit the generated path rule to the user terminal 100. In an embodiment, in the operation of generating the path rule, an NLU module 220 of the intelligence server 200 may include execution type information (e.g., TPF_SEND_MESSAGE) about the incomplete utterance in the path rule.

In an embodiment, the intelligence agent 145 may deliver the execution type information included in the path rule and information about at least one action, parameter information of which is omitted, among actions of the user terminal 100, configuring the path rule to a TPF module 160 of FIG. 3. The TPF module 160 may identify an application program associated with the incomplete utterance based on the execution type information and the information about the action, the parameter information of which is omitted, received from the intelligence agent 145. The TPF module 160 may obtain at least one parameter information required to perform a task (or a path rule associated with performing the task) from the identified application program and may output a GUI 123a including a field (e.g., a message recipient filed 1 and a message content field 3) corresponding to properties (e.g., name, date, time, or number, or the like) of the missing parameter information rendering the original command incomplete.

In an embodiment, the TPF module 160 may output the GUI 123a including all of fields respectively corresponding to a plurality of parameter information obtained from the identified application program. Alternatively, the TPF module 160 may output the GUI 123a including a field corresponding to parameter information omitted on an incomplete utterance of a user among the plurality of parameter information obtained from the identified application program. In various embodiments, when all the fields corresponding to the plurality of parameter information obtained from the identified application program are included in the GUI 123a, some of the fields may be displayed in a state where the plurality of parameter information are input. For example, all fields (e.g., a message recipient field and a message content field) associated with parameter information (e.g., a message recipient and message content) required to perform a task (e.g., message transmission) may be displayed in a blank state on the GUI 123a output according to occurrence of a first incomplete utterance (e.g., "Please send a message"). In case of occurrence of a second incomplete utterance (e.g., "Please send a message to a mom"), a portion (e.g., a message recipient field) of all the fields (e.g., the message recipient field and the message content field) associated with the parameter information (e.g., the message recipient and the message content) required to perform the task (e.g., message transmission) may be displayed in a state where parameter information (e.g., mom) included in the second incomplete utterance on the GUI 123a.

A processor 150 of the user terminal 100 may output the GUI 123a generated by the TPF module 160 on a display 120 of FIG. 1B. For example, the processor 150 may output the GUI 123a through execution of an intelligence app or execution of an application program associated with the TPF module 160.

In an embodiment, a text corresponding to an incomplete utterance (e.g., "Please send a message") received from the user may be displayed on a region adjacent to the GUI 123a. In this regard, the intelligence agent 145 may divide voice data of the incomplete utterance received through the microphone 111 by a specified unit (e.g., a syllable or the like) and may transmit the divided voice data to the intelligence server 200. An NLG module 250 of the intelligence server 200 may convert the voice data according to the specified unit into text data and may transmit the converted text data to the user terminal 100. The processor 150 may display first text data (e.g., a message) received from the NLG module 250 on a region adjacent to the GUI 123a and may display second text data (e.g., "send") received in a streaming form in an order subsequent to the first text data depending on transmission and reception of voice data and text data repeated (or looped) between the intelligence agent 145 and the NLG module 250. Alternatively, text data (e.g., "Who do you want to send?") (hereinafter referred to as "feedback text") corresponding to a field (e.g., the message recipient field 1 and the message content field 3) included in the GUI 123a may be displayed on a region adjacent to the GUI 123a. In various embodiments, the feedback text may be converted into voice data by a TTS module 260 of the intelligence server 200. The user terminal 100 may receive the voice data and may output the received voice data through a speaker 130 of FIG. 1B. In an embodiment, the NLG module 250 may obtain information about an action, parameter information of which is omitted, among actions of the user terminal 100, configuring a path rule with reference to an operation of generating the path rule at the NLU module 220. The NLG module 250 may generate the feedback text (e.g., "Who do you want to send?") for requesting the user to provide parameter information required to perform the action, the parameter information of which is omitted, and may transmit the generated feedback text to the user terminal 100. In various embodiments, the processor 150 may display a button including hint information (e.g., Hong Kildong or Kim Samsung) on a region adjacent to the feedback text at the same or similar time to an output of the feedback text based on a function action of a proposal module 149c of FIG. 1F. The hint information may be, for example, parameter information (e.g., a message recipient) recommended in response to the feedback text (e.g., "Who do you want send?"). Alternatively, the processor 150 may display a button (e.g., search contacts) for supporting search for parameter information corresponding to the feedback text on the user terminal 100 on a region adjacent to the feedback text.

In an embodiment, the user may recognize incompletion of utterance in response to the output GUI 123a or the displayed feedback text and may input a parameter information corresponding to the feedback text. In this case, likewise, the user terminal 100 may receive text data corresponding to the parameter information input utterance from the NLG module 250 and may display the received text data on a region adjacent to the GUI 123a or a corresponding field region. Alternatively, the user terminal 100 may display a feedback text (e.g., "What would you send?") for requesting the user to enter another parameter information. When all the plurality of parameter information corresponding to the fields included in the GUI 123a are input, the user terminal 100 may display a feedback text (e.g., "Would you like to send a message like this?") for requesting the user to verify the parameter information.

In an embodiment, when all the plurality of parameter information (e.g., a message recipient and message content) corresponding to the fields (e.g., the message recipient field 1 and the message content field 3) are input, the TPF module 160 may deliver at least one additionally input parameter information to an application program (hereinafter referred to as "first application program") corresponding to an incomplete utterance (e.g., "Please send a message"). In this operation, the intelligence agent 145 may deliver the path rule, received from the intelligence server 200, to the first application program. An execution manager module 147 of FIG. 1B, included in the first application program, may add parameter information transmitted from the TPF module 160 to actions of the user terminals 100, configuring a path rule, to update the path rule. When a task corresponding to an incomplete utterance of the user (e.g., "Please send a message") is performed according to performing the updated path rule of the first application program, the processor 150 may display a feedback text (e.g., "I sent the message.") corresponding to the completion of the performance of the task and a button 4 capable of receiving feedback (e.g. well done, let's improve, or the like) of the user on a speed recognition service on a region adjacent to the GUI 123a.

In various embodiments, when a specified time elapses at or after a time when the GUI 123a is output, the intelligence agent 145 may receive a user utterance (e.g., cancel, stop, I'll be off, I won't, or the like) of stopping or removing operation of the GUI 123a. In this case, the processor 150 may remove, for example, the GUI 123a in the form of fade-out or may immediately remove the GUI 123a.

Referring to FIG. 6, the user terminal 100 may include at least one application program capable of performing a task associated with a determined intent of a user utterance, as derived from an incomplete utterance (or a path associated with performing the task). In various embodiments, the at least one application program may include at least one preloaded application program (e.g., a message application program, a mail application program, or the like) installed when the user terminal 100 is manufactured, at least one third party application program (e.g., a messenger application program or the like) downloaded from an online market, or a chatbot program for outputting a UI 121 of the intelligence app. At least a portion of the application program (e.g., a message, mail, or messenger application program or the like) or the chatbot program (e.g., a food order chatbot, a travel chatbot, or the like) may include a function capable of performing a task (e.g., message transmission) corresponding to an incomplete utterance (e.g., "Please send a message") of the user. In an embodiment, the intelligence agent 145 of the user terminal 100 may identify at least one application program or a chatbot program, which is capable of performing the task corresponding to the incomplete utterance on the user terminal 100 with reference to a path rule received from the intelligence server 200 or execution type information included in the path rule. The intelligence agent 145 may deliver information (e.g., a program identifier (e.g., a program name)) about the at least one identified application program or the identified chatbot program to the processor 150. The processor 150 may output a GUI 123b for requesting parameter information omitted on an incomplete utterance on one region of a screen where an intelligence app is executed or one region of a screen where an application program associated with the TPF module 160 is executed and may display at least one content 125 (e.g., an icon, a text, a symbol, or the like) corresponding to information about an application program or a chatbot program received from the intelligence agent 145 on a region adjacent to the GUI 123*b*. In this case, the user may select (e.g., touch) an application program or a chatbot program to perform a task (e.g., message transmission) according to an incomplete utterance (e.g., "Please send a message") and may perform an additional utterance to input parameter information to the GUI 123*b*. Alternatively, an order of selecting the application program or the chatbot program and inputting the parameter information may be changed.

Referring to FIG. 7, at least one application program capable of performing a task requested by the above-mentioned incomplete utterance may vary in parameter information required to perform the task. In this regard, upon detection of a first incomplete utterance (e.g., "Please order a pizza from A"), the TPF module 160 may identify a first application program (e.g., application program A) associated with performing a task (e.g., ordering a pizza) according to the first incomplete utterance. In an embodiment, the first application program may entail performing a path rule configured with a first action (e.g., execute the first application program), a second action (e.g., retrieve pizza menu information), a third action (e.g., acquire address information), and a fourth action (e.g., acquire payment information) to perform the task. Thus, the TPF module 160 may obtain menu information, address information, and payment information as parameter information required to perform the task or the path rule from the first application program and may output a GUI 123*c* including a field (e.g., a menu information field 5, an address information field 7, and a payment information field 9) corresponding to properties of the obtained parameter information.

In case of a second user utterance (e.g., "Please order a pizza from B"), although associated with performing the same or similar task (e.g., an order for a pizza) to a task (e.g., an order for a pizza) according to the above-mentioned first user utterance, parameter information required to perform the task at a second application program (e.g., application program B) corresponding to the second user utterance may differ from parameter information required at the first application program. In this regard, the second application program may entail execution along a path rule configured with a first action (e.g., execution of the second application program), a second action (e.g., acquisition of menu information), a third action (acquisition of address information), a fourth action (e.g., acquisition of delivery time information), and a fifth action (e.g., acquisition of payment information) to perform the task. Thus, a GUI 123*d* output in connection with the second user utterance may include fields (a menu information field 5, an address information field 7, a delivery time information field 11, and a payment information field 9) associated with menu information, address information, delivery time information, and payment information corresponding to parameter information for performing the path rule.

FIGS. 8 to 12 are drawings illustrating various forms of a GUI (e.g., a displayed graphic element, input field and/or selectable icon) according to an embodiment.

Figure 8:
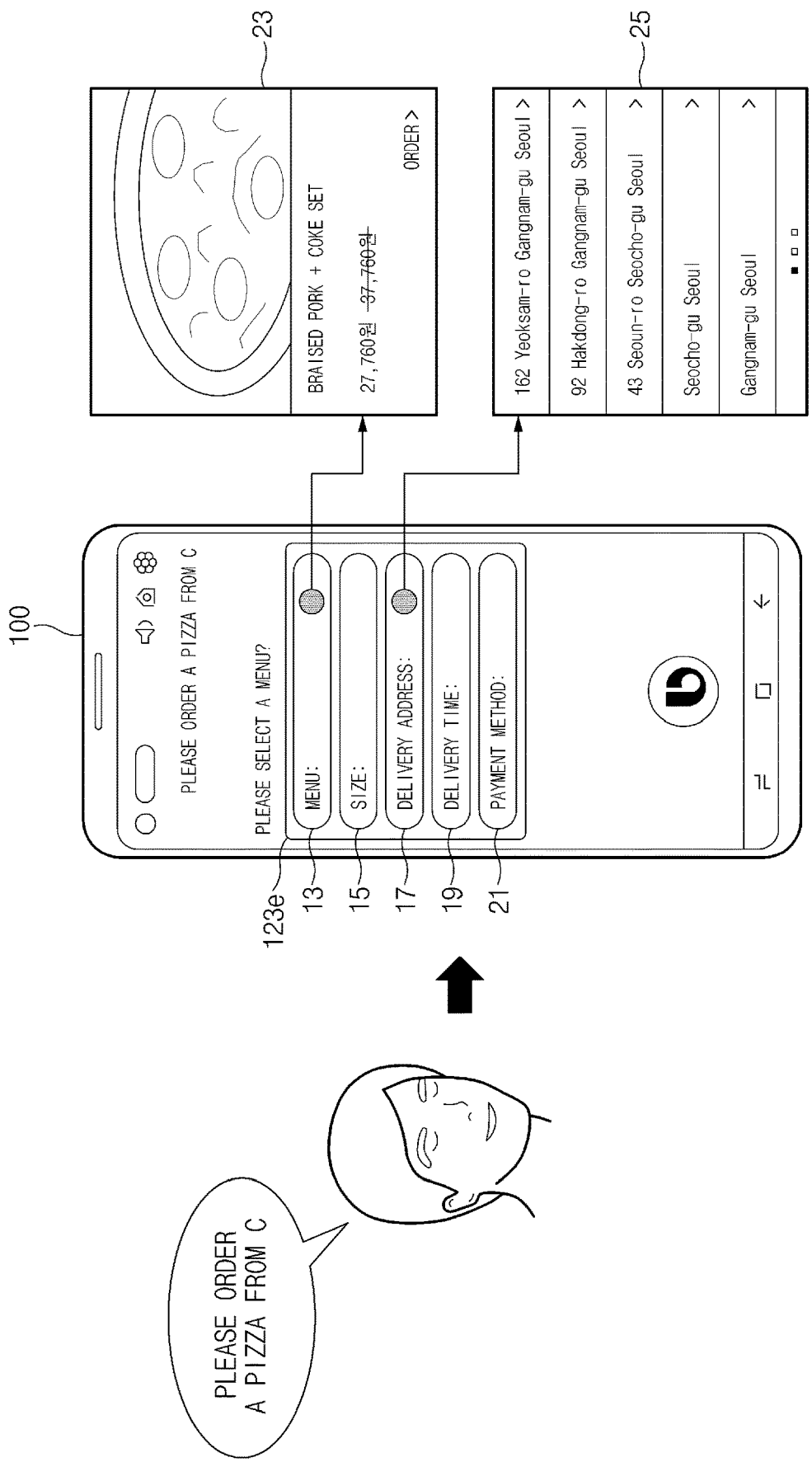
FIG. 8 is a drawing illustrating a first form of a graphic user interface (GUI) according to an embodiment.

Referring to FIG. 8, an intelligence agent 145 of FIG. 1B may obtain at least one parameter information omitted within an incomplete utterance, based on another type of user input (e.g., a touch input) other than a parameter information input utterance of a user, which occurs in response to an output of a GUI 123*e*. In this regard, when a touch input by a portion (e.g., a finger) of a user's body is provided to at least one field 13, 15, 17, 19, and/or 21 included in the GUI 123*e*, the intelligence agent 145 may receive the touch input and may deliver the touch input to a TPF handler 167 of FIG. 3. The TPF handler 167 may control an activity 165 of FIG. 3 to display content corresponding to parameter information associated with the field from the field to which the touch input is provided. For example, the GUI 123*e* that is output responsive to receiving an incomplete utterance (e.g. "Please order a pizza from C") may include fields (e.g., a menu information field 13, a size information field 15, an address information field 17, a time information field 19, a payment information field 21, and/or the like) for at least one parameter information (e.g., a menu, a size, an address, a time, and/or payment) required to complete performance of the relevant task (e.g., an order for a pizza) (or a path rule associated with performing the task) corresponding to the incomplete utterance. When a touch input of the user is detected to any one (e.g., the menu information field 13) of the fields, content (e.g., a text, an image, or the like associated with a pizza menu) corresponding to parameter information (e.g., a pizza menu) associated with the field 13 may be displayed in the form of, for example, a pop-up window 23 (or a list window 25). For example, the pop-up window 23 (or the list window 25) may overlap at least in part with the GUI 123*e* or may be displayed on a region adjacent to the GUI 123*e*. In this regard, a translator 163 of FIG. 3 may further obtain content information corresponding to at least one parameter information in an operation of obtaining the at least one parameter information required to perform a task from an application program associated with an incomplete utterance. When the GUI 123*e* is generated, the activity 165 may map the content information to a corresponding field. In an embodiment, when the pop-up window 23 is selected (e.g., touched), a text associated with content included in the pop-up window 23 may be displayed as parameter information on a corresponding field. Alternatively, in case of a list window 25, a text according to a selected list may be displayed as parameter information on a corresponding field. According to various embodiments, a processor 150 of a user terminal 100 of FIG. 1B may output a software input panel (SIP) keyboard in response to a first touch input of the user to the field 13, 15, 17, 19, and/or 21. The processor 150 may receive a second touch input provided to the SIP keyboard and may deliver an input signal to the TPF handler 167. The TPF handler 167 may control the activity 165 to display a text according to the second touch input on the field to which the first touch input is provided.

Figure 9:
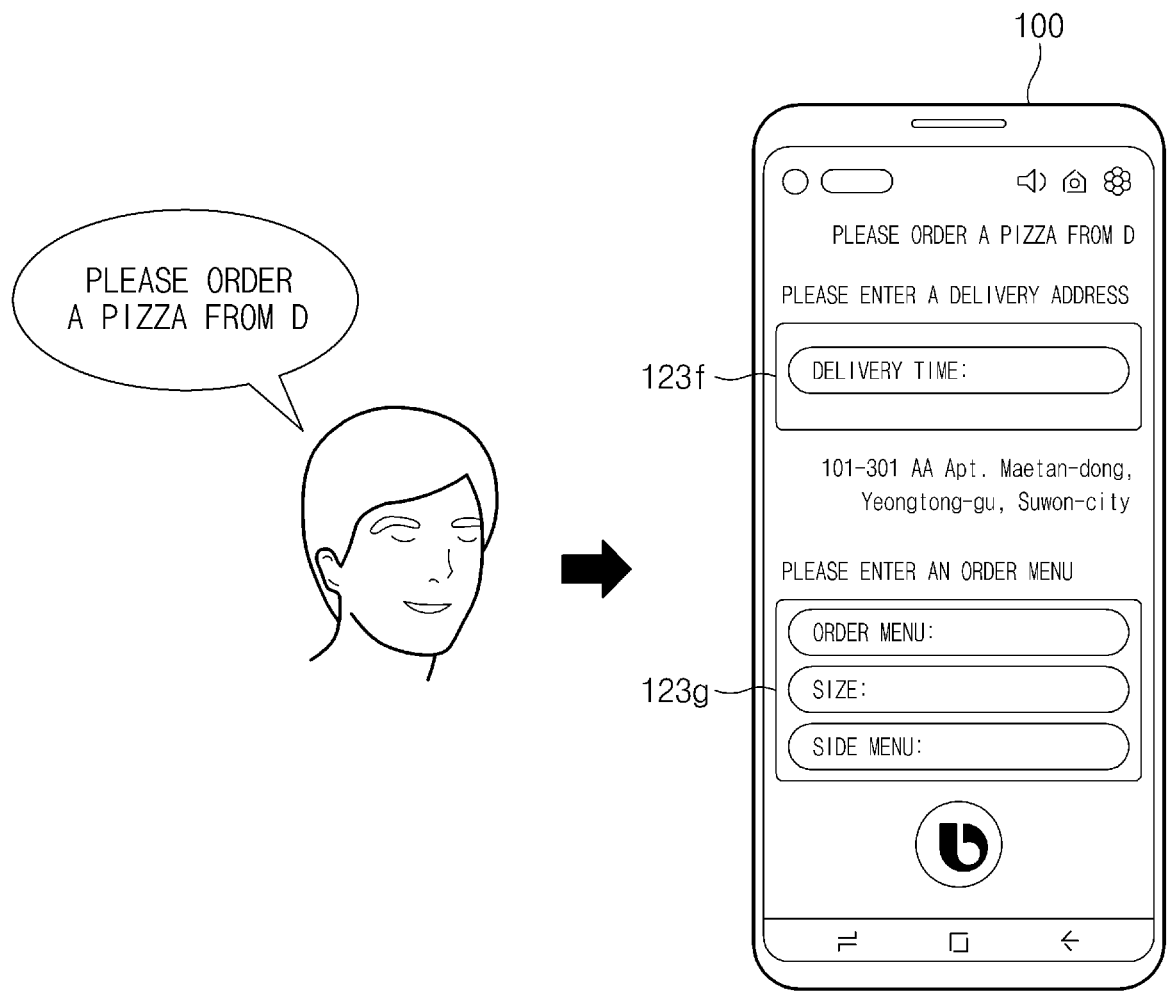
FIG. 9 is a drawing illustrating a second form of a GUI according to an embodiment.

Referring to FIG. 9, a GUI output on the user terminal 100 include a number of input fields. For example, the GUI may include a first GUI 123*f* including a field disposed at an upper portion of the display, and a second GUI 123*g* including the at least one other field. In an embodiment, the intelligence agent 145 may interact with an NLG module 250 of an intelligence server 200 of FIG. 1D to obtain and output feedback (e.g., "Please enter a delivery address") associated with a field (e.g., a delivery address information field) in the first GUI 123*f*. In various embodiments, when receiving an input utterance including parameter information in response to the feedback, a field (e.g., an order menu information field) included in the second GUI 123*g* may be moved to the first GUI 123*f*. In this case, a field (e.g., a delivery time information field) previously included in the first GUI 123*f* may be maintained in the first GUI 123*f* in a state where parameter information is entered according to the parameter information input utterance of the user.

Figure 10:
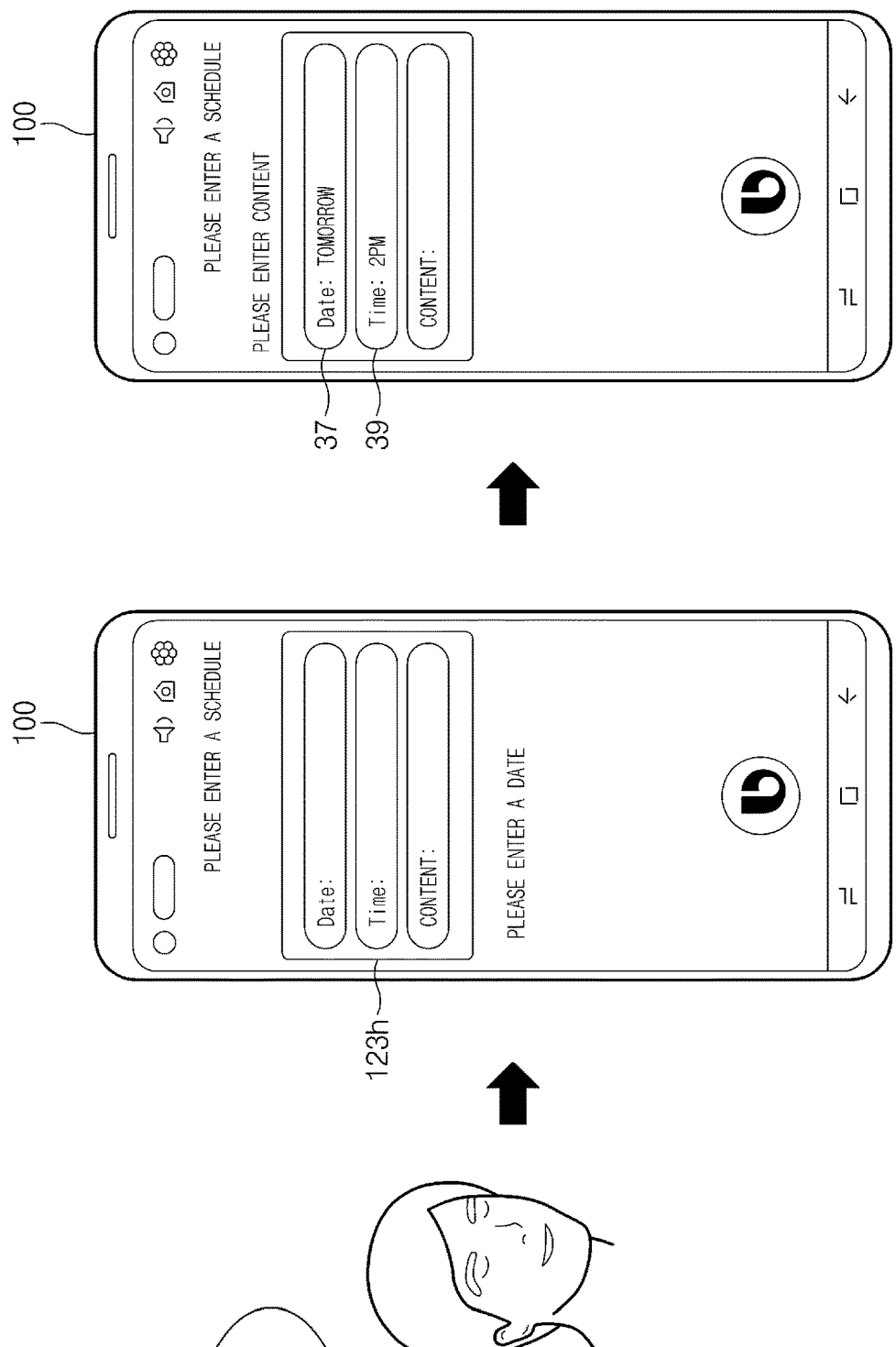
FIG. 10 is a drawing illustrating a third form of a GUI according to an embodiment.

Referring to FIG. 10, a GUI 123*h* may be output on the user terminal 100 in response to detecting an incomplete utterance (e.g., "Please enter a schedule"), and may include at least one field (e.g., a date information field, a time information field, and/or content information field) for at least one parameter information (e.g., a date, a time, and/or content) required to perform the corresponding task (e.g., scheduling) according to the incomplete utterance. In an embodiment, the user may input a parameter information (e.g., 2 p.m. tomorrow) in response to feedback (e.g., "Please enter a date") output or displayed on the GUI 123*h*. The parameter information input utterance of the user may include a plurality of parameter information (e.g., a date such as "tomorrow" and a time such as "2 p.m."). In this case, parameter information respectively corresponding to a date information field 37 and a time information field 39 may be displayed at the same or similar time on the date information field 37 and the time information field 39 included in the GUI 123*h*.

Figure 11:
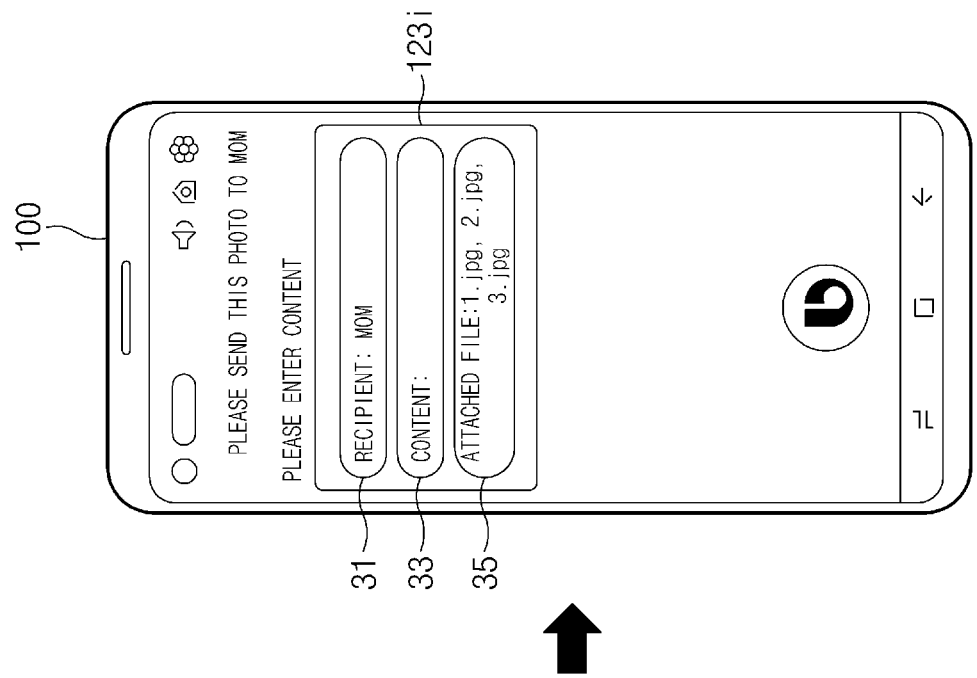
FIG. 11 is a drawing illustrating a fourth form of a GUI according to an embodiment.
Figure 11:
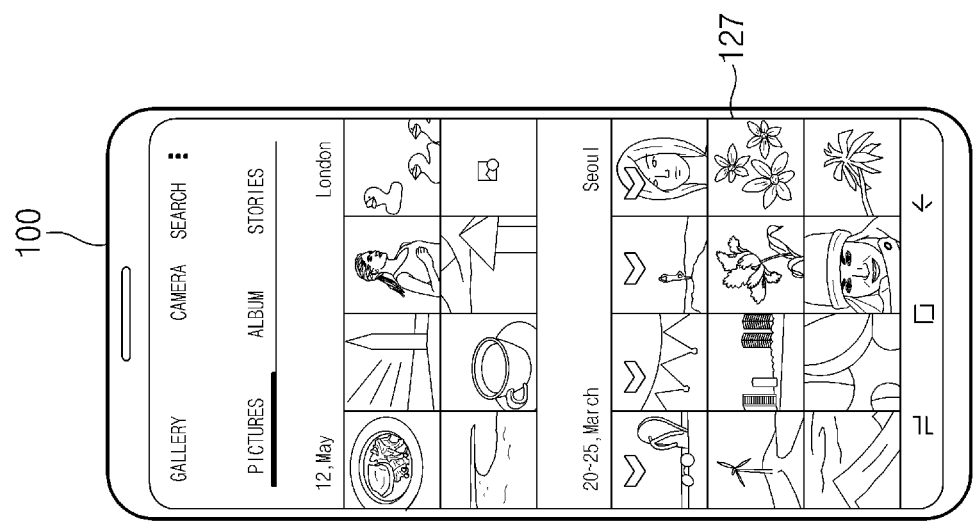

Referring to FIG. 11, at a time when a GUI 123*i* is output, at least a portion of at least one field included in the GUI 123*i* may include display of corresponding parameter information. For example, parameter information included in an incomplete utterance due to an output of the GUI 123*i* is displayed. The at least portion of the at least one field may be output in a state where a corresponding parameter is displayed based on log information of the user terminal 100 at a similar time to the incomplete utterance (or within a specified time range from the incomplete utterance). For example, the user may select any content (e.g., a photo) through execution of a specific application program (e.g., a gallery application program 127) and may then input an incomplete utterance (e.g., "Please send this photo to mom") associated with transmitting the content. The GUI 123*i* output in response to the incomplete utterance may include a field (e.g., a recipient information field 31 or a content information field 33) associated with parameter information necessarily required to perform a task (e.g., photo transmission). Alternatively, the GUI 123*i* may further include a field (e.g., a file information field 35) associated with parameter information additionally required to perform the task. In this case, as parameter information (e.g., a recipient "mom") corresponding to one or more fields (e.g., the recipient information field 31) included in the GUI 123*i* is included on the incomplete utterance, upon the output of the GUI 123*i*, the some fields (e.g., the recipient information field 31) may be output in a state where parameter information (e.g., the recipient "mom") included on the incomplete utterance is displayed. Alternatively, as there is log information according to the selection of the content stored in a memory 140 of FIG. 1B substantially matching time relative to the receipt of the incomplete utterance (or within a predetermined threshold time range of receiving the incomplete utterance), a corresponding field (e.g., the file information field 35) may be output when parameter information (e.g., an attached file) is displayed.

Figure 12:
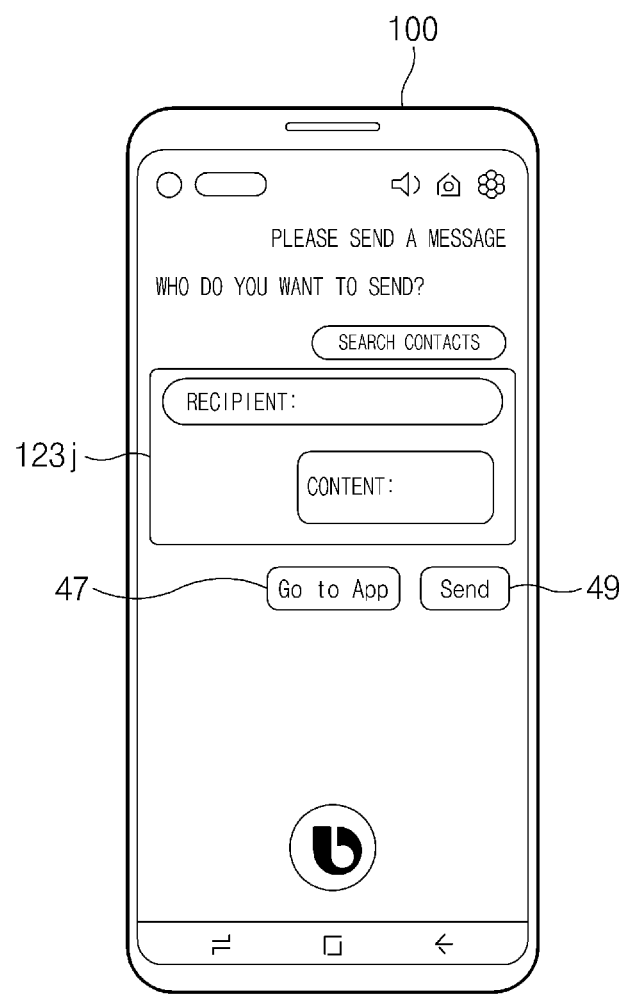
FIG. 12 is a drawing illustrating a fifth form of a GUI according to an embodiment.

Referring to FIG. 12, the processor 150 of the user terminal 100 may display a first button 47 for supporting inputs of additional parameter information and/or a second button 49 selectable to end operations of the GUI 123*j*, as displayed on a region adjacent to the GUI 123*j*. In this regard, the GUI 123*j* may receive parameter information (e.g., a message recipient and message content) required to perform a task (e.g., message transmission) according to an incomplete utterance, but may in some cases fail to support to input of the parameter information (e.g., a message title or the like) additionally associated with performing the task. Thus, when the user wants to enter additional parameter information in connection with performing the task corresponding to the incomplete utterance, he or she may provide a user input (e.g., touch) to the first button 47. The processor 150 may execute an application program associated with the GUI 123*j* (or an incomplete utterance or a task) in response to detection of the user input to the first button 47. When a user input (e.g., touch) is provided to the second button 49, a TPF handler 167 of a TPF module 160 of FIG. 3 may deliver at least one parameter information, input to the GUI 127*j*, to a related application program through a deep link 169 of FIG. 3.

Figure 13:
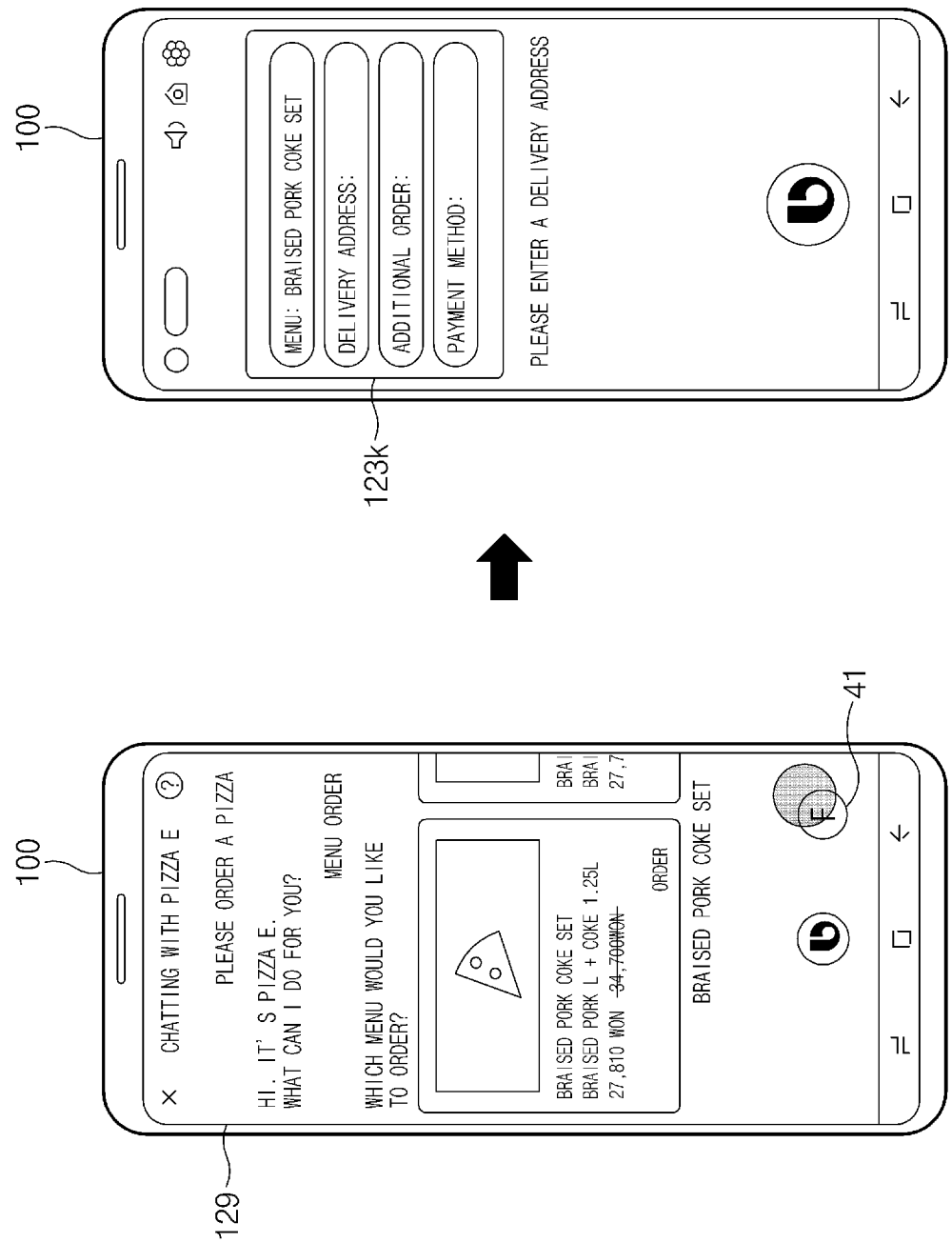
FIG. 13 is a drawing illustrating a form of calling a GUI according to an embodiment.

FIG. 13 is a drawing illustrating a form of calling a GUI according to an embodiment.

Referring to FIG. 13, a user terminal 100 according to an embodiment may include a function of requesting the above-mentioned GUI from a screen where an application program loaded or installed in the user terminal 100 is executed or a UI (e.g., a UI 121 of FIG. 1C) of an intelligence app. In this regard, a processor 150 of the user terminal 100 may output, for example, a button 41 selectable to request display of a GUI on one region of a screen 129, where an application program executed in response to user control is executed (or the UI 121 of the intelligence app). In an embodiment, the button 41 may be included in a layer of the screen 129 where the application program is executed (or the UI 121 of the intelligence app) or may be included in a separate layer to be displayed in a floating form.

In an embodiment, when a user input (e.g., a touch input) is provided to at least a portion of the button 41, the processor 150 may request a TPF module 160 of FIG. 3 to generate a GUI 123*k* associated with the screen 129 where the application program is executed (or the UI 121 of the intelligence app). In this regard, when a user input is provided to the button 41 included in the screen 129 where the application program is executed, the processor 150 may deliver identification information of the application program (e.g., an application program ID, a state ID of the application program, or the like) to the TPF module 160. Alternatively, when a user input is provided to a button capable of being included in the UI 121 of the intelligence app (e.g., a button of a function of calling a related GUI to be same or similar to the button 41 included in the screen 129 where the application program is executed), the processor 150 may deliver identification information of a chatbot program associated with outputting the UI 121 (e.g., a chatbot program ID, a chatbot program name, deep link information, or the like) to the TPF module 160.

In an embodiment, a translator 163 of the TPF module 160 may access a related application program based on the identification information of the application program and may obtain parameter information required to perform a task performable on the screen 129 where the application program is executed, from the application program. Alternatively, the translator 163 may obtain parameter information required to perform a task performable in the UI 121 of the intelligence app from the chatbot program based on the identification information of the chatbot program. Thus, a GUI 123*k* triggered and output by a user input to the button 41 may include at least one field associated with parameter information required to perform a task performable on the screen 129 where the application program is executed or the UI 121 of the intelligence app.

Figure 14:
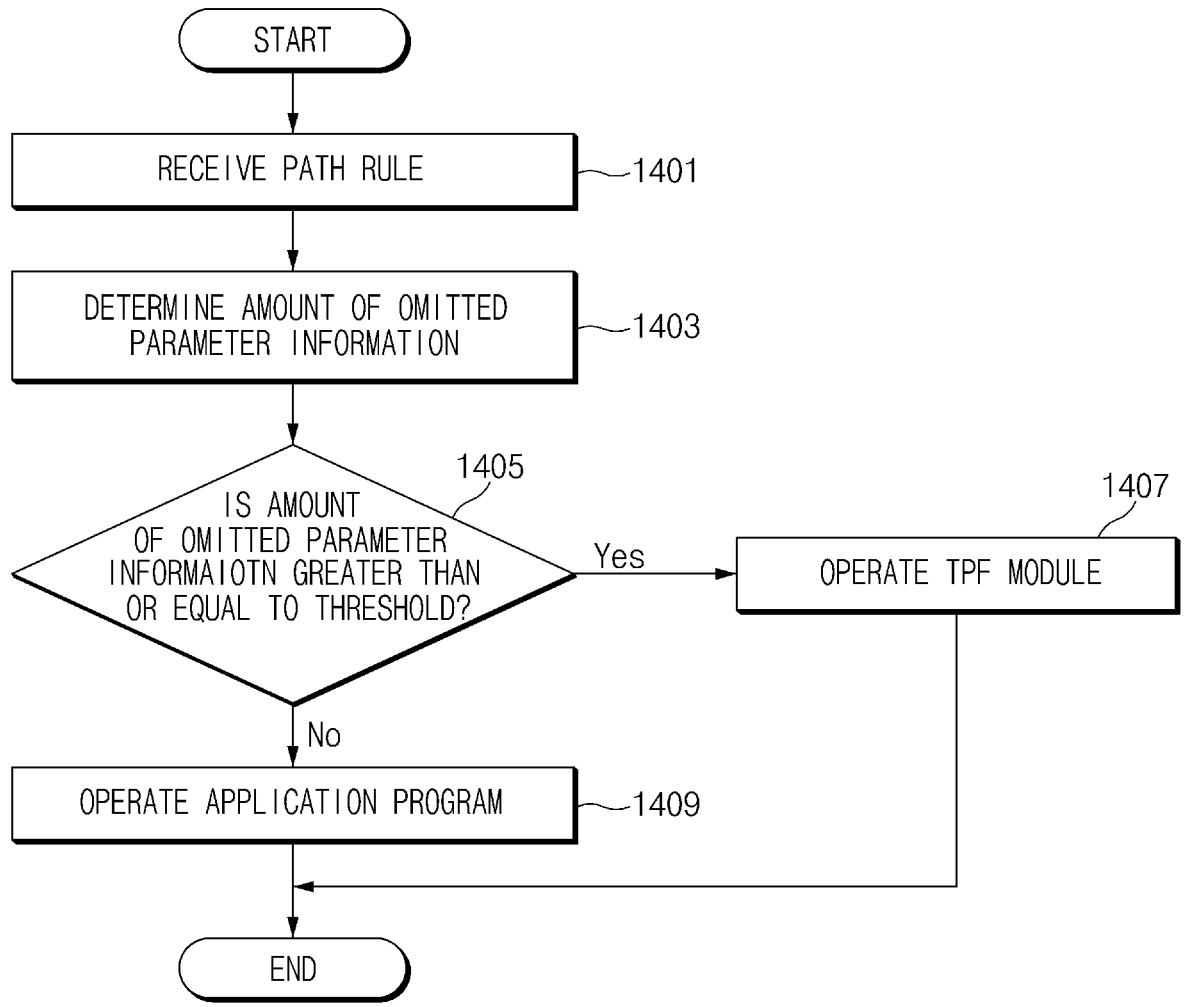
FIG. 14 is a flowchart illustrating a method for operating and determining a target parameter filling (TPF) module of a user terminal according to an embodiment.

FIG. 14 is a flowchart illustrating a method for operating and determining a TPF module of a user terminal according to an embodiment.

According to an embodiment, irrespective of whether a path rule received from an intelligence server 200 of FIG. 1D includes execution type information depending on an incomplete utterance of a user, when the path rule meets a specified condition, a user terminal 100 of FIG. 1B may output a GUI.

Referring to FIG. 14 in connection with the above-mentioned contents, in operation 1401, an intelligence agent 145 of FIG. 1B may receive a path rule from the intelligence server 200. For example, the intelligence agent 145 may receive an incomplete utterance of the user, containing a specific command (e.g., a command about a task to be performed through a user terminal 100 of FIG. 1B) and may transmit the received incomplete utterance to the intelligence server 200. The intelligence agent 145 may receive a path rule generated based on recognition of the incomplete utterance from the intelligence server 200. In an embodiment, the path rule may include execution type information according to the incomplete utterance or fail to include the execution type information.

In operation 1403, the intelligence agent 145 may determine an amount of parameter information omitted on the received path rule, including the specific pieces of parameter information that are omitted. For example, the intelligence agent 145 may analyze the path rule and may identify at least one action, parameter information of which is omitted, among actions of the user terminal 100, configuring the path rule, and the amount of the omitted parameter information.

In operation 1405, the intelligence agent 145 may compare the amount of the parameter information omitted on the path rule with a specified threshold to determine whether the amount of the parameter information is greater than or equal to a predefined threshold. For example, if the case where an incomplete utterance is associated with requiring two pieces of parameter information (e.g., such as a message and a recipient), a threshold may be predefined as a count of one or two pieces.

When the amount of the omitted parameter information is greater than or equal to the specified threshold as a result of the determination (Yes), in operation 1407, the intelligence agent 145 may transmit identification information regarding at least one action of the user terminal 100 and parameter information of which is omitted, (e.g., a state ID of the user terminal 100, associated with performing the at least one action) to a TPF manager 161 of a TPF module 160 of FIG. 3. In this case, as described above, the TPF module 160 may obtain parameter information required to perform a task according to an incomplete utterance from an application program corresponding to the incomplete utterance of the user based on the identification information and may generate a GUI including a field corresponding to the obtained parameter information. Assuming that the specified threshold is 1, as an example of operations 1405 and 1407, in case of a first incomplete utterance (e.g., "Please send a message"), as both of first parameter information (e.g., a message recipient) and second parameter information (e.g., message content) required to perform a task (e.g., message transmission) are omitted, the path rule received from the intelligence server 200 may be in a state where the two parameter information are omitted. As such, when the parameter information omitted on the received path rule is greater than or equal to the specified threshold (e.g., 1), in operation 1407, the intelligence agent 145 may operate the TPF module 160 to generate a GUI.

When the amount of the omitted parameter information is less than the specified threshold as a result of the determination (No), in operation 1409, the intelligence agent 145 may operate an application program associated with the path rule received from the intelligence server 200. For example, in case of a second incomplete utterance (e.g., "Please send a message to mom"), since single parameter information (e.g., message content) among at least one parameter information (e.g., a message recipient and the message content) required to perform a task (e.g., message transmission) is omitted, as the amount of the omitted parameter information is less than the threshold (e.g., 1), the intelligence agent 145 may allow an execution manager module 147 of FIG. 1B to deliver the path rule to an execution service module of a related application program. In this case, the application program may perform the path rule and may request the user to provide an additional input of the user to the omitted parameter information (e.g., message content) at a time when an action of the specific user terminal 100 (e.g., an action of inputting message content), included in the path rule, is changed to a performable state.

Figure 15:
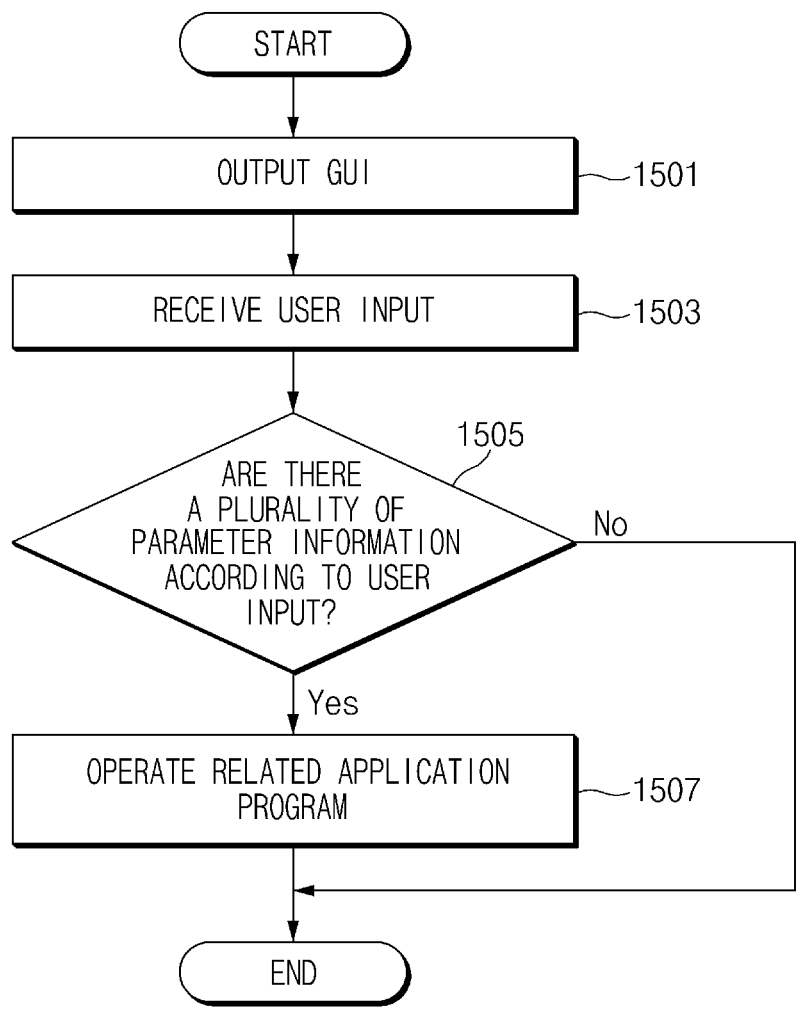
FIG. 15 is a flowchart illustrating a method for processing a plurality of parameter information input to a GUI according to an embodiment.

FIG. 15 is a flowchart illustrating a method for processing a plurality of parameter information input to a GUI according to an embodiment.

Referring to FIG. 15, in operation 1501, a processor 150 of a user terminal 100 of FIG. 1B may output a GUI for additionally receiving parameter information from a user depending on an incomplete utterance of the user.

In operation 1503, an intelligence agent 145 of the user terminal 100 may receive an additional input of the user, which is detected after the output of the GUI. For example, the intelligence agent 145 may receive a user input inputting parameter information omitted on the incomplete utterance on the GUI (e.g., a voice or text input including the omitted parameter information).

In operation 1505, the processor 150 may identify an information resource corresponding to parameter information indicated by the additional input of the user, received at the intelligence agent 145, among information resources stored in the user terminal 100 and may determine an amount of the information resource. For example, when the user speaks "Hong Kildong" or enters text indicating a previously called party on the GUI, the processor 150 may access an application program (e.g., a call application program) associated with the previously called party to retrieve information resources stored in association with "Hong Kildong" and may determine an amount of the stored information resources. Alternatively, the processor 150 may access a chatbot program associated with an utterance or text in response to an additional utterance input or an additional text input of the user and may obtain an information resource corresponding to an utterance or text input from the chatbot program.

In an embodiment, when the amount of the information resource obtained by the processor 150 is determined as a plurality of information resources (Yes), in operation 1507, the processor 150 may execute the application program (or the chatbot program) to obtain a user selection for any one of the plurality of information resources, and, for example, may output a screen (e.g., a contact list screen or the like) associated with the obtained information resources.

In various embodiments, when single parameter information (e.g., a called party) is omitted on the incomplete utterance (No), the processor 150 may convert a screen of an application program which is being output or a UI 121 of an intelligence app according to execution of the chatbot program into a screen where a task (e.g., a phone call) is performed, without being converted into the GUI in response to a user selection which occurs on the screen (e.g., the contact list screen) and may perform the task (e.g., the phone call) according to the incomplete utterance.

Alternatively, when a plurality of parameter information are omitted on the incomplete utterance, after obtaining a user selection from the screen (e.g., the contact list screen), the processor 150 may control conversion into the GUI from the screen of the application program which is being output or the UI 121 of the intelligence app and may request the user to provide an additional input of another omitted parameter information.

Figure 16:
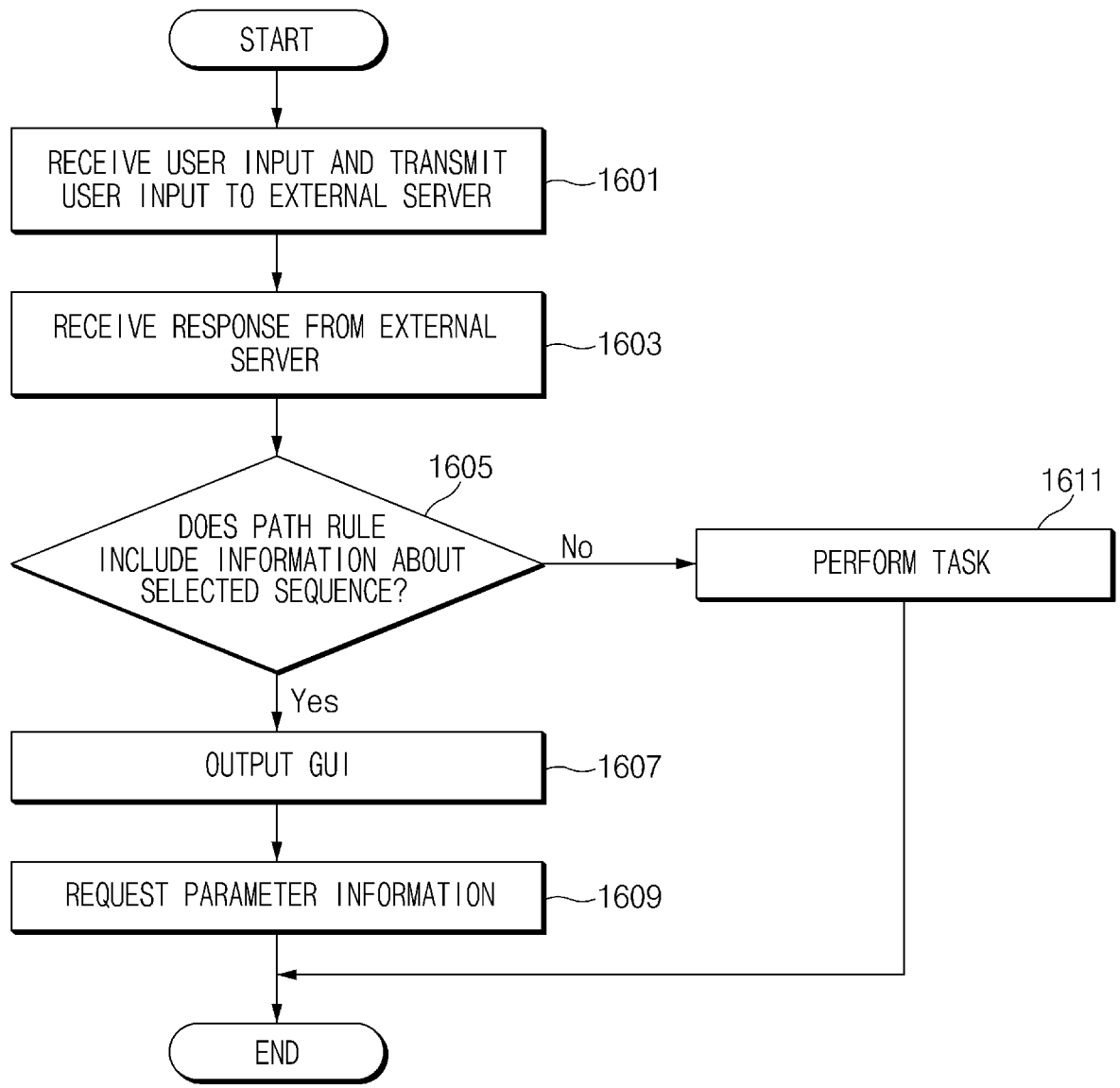
FIG. 16 is a flowchart illustrating a method for operating a speech recognition service according to an embodiment.

FIG. 16 is a flowchart illustrating a method for operating a speech recognition service according to an embodiment.

Referring to FIG. 16, in operation 1601, a user terminal 100 of FIG. 1B may receive a user input (e.g., a voice input) and may transmit the received user input to an external server (e.g., an intelligence server 200 of FIG. 1D). For example, an intelligence agent 145 of the user terminal 100 may receive a user utterance requesting the user terminal 100 to perform a specific task, through a microphone 111 of FIG. 1C, mounted on the user terminal 100, and may transmit voice data according to the utterance to the external server (e.g., the intelligence server 200) in accordance with processing the user utterance.

In operation 1603, the intelligence agent 145 may receive a response (e.g., a path rule) from the external server. In this regard, the external server may extract an intent of the user utterance by executing recognition of voice data received from the user terminal 100 generating a path rule corresponding to the extracted intent (e.g., the path rule indicated a sequence of actions or states of the user terminal 100 for carrying out the intent), and transmitting the generated path rule to the user terminal 100.

In operation 1605, the intelligence agent 145 may analyze a path rule according to the response of the external server and may determine whether the path rule includes information about a selected sequence. In an embodiment, the information about the selected sequence may be understood as execution type information (e.g., TPF_SEND_MESSAGE, TPF_SEND_EMAIL, TPF_CREATE_EVENT, TPF_CREATE_TASK, TPF_MAKE_CALL, TPF_MAKE_CALL_VIDEO, TPF_FIND_CONTACT, TPF_CREATE_REMINDER, TPF_SET_ALARM, TPF_EDIT_ALARM, or the like) specified (or selected) by the outside.

In an embodiment, when the path rule according to the response of the external device includes execution type information corresponding to the user utterance (Yes), in operation 1607, the intelligence agent 145 may control a TPF module 160 of FIG. 3 to output a GUI. For example, when the path rule received from the external device includes the execution type information, the intelligence agent 145 may determine the user utterance includes an incomplete utterance in which at least one portion of parameter information required to perform the task has been omitted, and may output a GUI prompting a user to provide the omitted parameter information. In an embodiment, the GUI may include fields respectively corresponding to all parameter information required to perform the task or may include a field for receiving the some omitted parameter information. In various embodiments, when the GUI includes the fields respectively corresponding to all the parameter information, a field corresponding to some parameter information included in the user utterance may be output in a state where the parameter information is displayed. In various embodiments, the intelligence agent 145 may identify an amount of parameter information omitted on the path rule, irrespective of whether the path rule includes the execution type information and may output the GUI when the identified amount is greater than a specified threshold.

In operation 1609, the intelligence agent 145 may request provision of the omitted parameter information. In this regard, the intelligence agent 145 may interact with the external server to receive feedback in the form of a text or voice for requesting parameter information corresponding to at least one field included in the GUI and may display the feedback on the GUI or may output the feedback through a speaker 130 of the user terminal 100.

In an embodiment, when the path rule according to the response of the external device does not include the execution type information corresponding to the user utterance (No), in operation 1611, the user terminal 100 may perform a task based on the path rule received from the external server. In this regard, the intelligence agent 145 may deliver the path rule, received from the external server, to an execution manager module 147 of FIG. 1B. The execution manager module 147 may deliver the transmitted path rule to an execution service module in an application program associated with the path rule. The execution service module may sequentially perform actions of the user terminal 100, configuring the path rule. In this operation, when parameter information corresponding to some actions of the user terminal 100 is omitted, the application program may request the user to provide an additional input of the user for the omitted parameter information at a time when an action of the user terminal 100, the parameter information of which is omitted, is changed to a performable state.

An electronic device according to various embodiments may include a housing, a touch screen display configured to be located in the housing and be exposed through a first region of the housing, a microphone configured to be located in the housing and be exposed through a second region of the housing, at least one speaker configured to be located in the housing and be exposed through a third region of the housing, a wireless communication circuit configured to be located in the housing, a processor configured to be located in the housing and be electrically connected with the touch screen display, the microphone, the at least one speaker, and the wireless communication circuit, and at least one memory configured to be located in the housing and be electrically connected with the processor.

According to various embodiments, the at least one memory may store instructions, when executed, causing the processor to receive a first user input including a request to perform a task which requires at least one first parameter, via the microphone; transmit first data associated with the first user input to an external server via the wireless communication circuit; receive from the external server a response including information about a sequence of states of the electronic device to perform the task via the wireless communication circuit; determine whether at least one second parameter among the at least one first parameter is omitted from the first user input, based on whether execution type information is received from the server with the received sequence of states; when the execution type information is received from the external server, display a graphical user interface (GUI) including at least one input field requesting input of the at least one second parameter; and when the execution type information is not received from the external server, execute a portion of the sequence of states less than an entirety of the sequence of states to perform a portion of the task.

According to various embodiments, the execution type information identifies information referenceable by a function to execute the task which is missing from the first user input.

According to various embodiments, the at least one memory further stores instructions, when executed, causing the processor to: identify at least one second parameter omitted from the first user input among the at least one first parameter required to perform the task; and identify an application program associated with performing the task, using information about a particular state from among the sequence of states, the particular state corresponding to the at least one identified second parameter.

According to various embodiments, the at least one memory further stores instructions, when executed, causing the processor to: obtain information about the at least one the second parameter required to perform the task from the identified application program.

According to various embodiments, the at least one memory further stores instructions, when executed, causing the processor to: receive a second user input inputting the at least one second parameter into a particular input field displayed in the GUI and displaying the at least one input second parameter in the particular input field.

According to various embodiments, the at least one memory further stores instructions, when executed, causing the processor to: when the at least one second parameter is displayed in the particular input field, provide at least a portion of the at least one second parameter to the identified application program.

According to various embodiments, the second user input comprises at least one of a touch input received via the touch screen display and a voice input received via the microphone.

According to various embodiments, the at least one memory further stores instructions, when executed, causing the processor to: receive a third user input at a time after outputting the GUI; and terminate displaying the GUI in response to the third user input.

According to various embodiments, the at least one memory further stores instructions, when executed, causing the processor to: display content associated with at least one application program associated with performing the task on a region overlapping at least a part of the displayed GUI or a region adjacent to the displayed GUI.

According to various embodiments, the at least one memory further stores instructions, when executed, causing the processor to: when at least a portion of the at least one first parameter required to perform the task is included in the first user input, display the parameter included in the first user input on an input field corresponding to the parameter included in the first user input included in the GUI.

A method for operating a speech recognition service in an electronic device according to various embodiments include receiving a first user input including a request to perform a task; transmitting first data associated with the first user input to an external server using a wireless communication circuit; receiving from the external server a sequence of states executable by the electronic device to perform the task; determining by at least one processor whether at least one second among the at least one first parameter is omitted from the first user input, based on whether execution type information is received from the server with the received sequence of states; when the execution type information is received from the external server, displaying by a touch screen display a graphical user interface (GUI) including at least one input field requesting input of the at least one second parameter; and when the execution type information is not received from the external server, executing a portion of the sequence of states less than an entirety of the sequence of states to perform a portion of the task.

According to various embodiments, the execution type information identifies information referenceable by a function to execute the task which is missing from the first user input.

According to various embodiments, the method may further include identifying at least one second parameter omitted from the first user input the at least one first parameter required to perform the task; and identifying an application program associated with performing the task, using information about a particular state from among the sequence of states, the particular state corresponding to the at least one identified second parameter.

According to various embodiments, the method may further include obtaining information about the at least one the second parameter required to perform the task from the identified application program.

According to various embodiments, the GUI includes a plurality of input fields requesting input of multiple parameters identified as omitted from the first user input, the method further comprising: receiving a second user input inputting the at least one second parameter into a particular input field displayed in the GUI and displaying the at least one input second parameter in the particular input field.

According to various embodiments, the method may further include when the at least one second parameter is displayed in the particular input field, providing at least a portion of the at least one second parameter to the identified application program.

According to various embodiments, the second user input comprises at least one of a touch input received via the touch screen display and a voice input received via a microphone.

According to various embodiments, the method may further include receiving a third user input at a time after outputting the GUI; and terminate displaying the GUI in response to the third user input.

According to various embodiments, the method may further include displaying content associated with at least one application program associated with performing the task on a region overlapping at least a part of the displayed GUI or a region adjacent to the displayed GUI.

According to various embodiments, the method may further include when at least a portion of the at least one first parameter required to perform the task is included in the first user input, displaying the parameter included in the first user input on an input field corresponding to the parameter included in the first user input included in the GUI.

Figure 17:
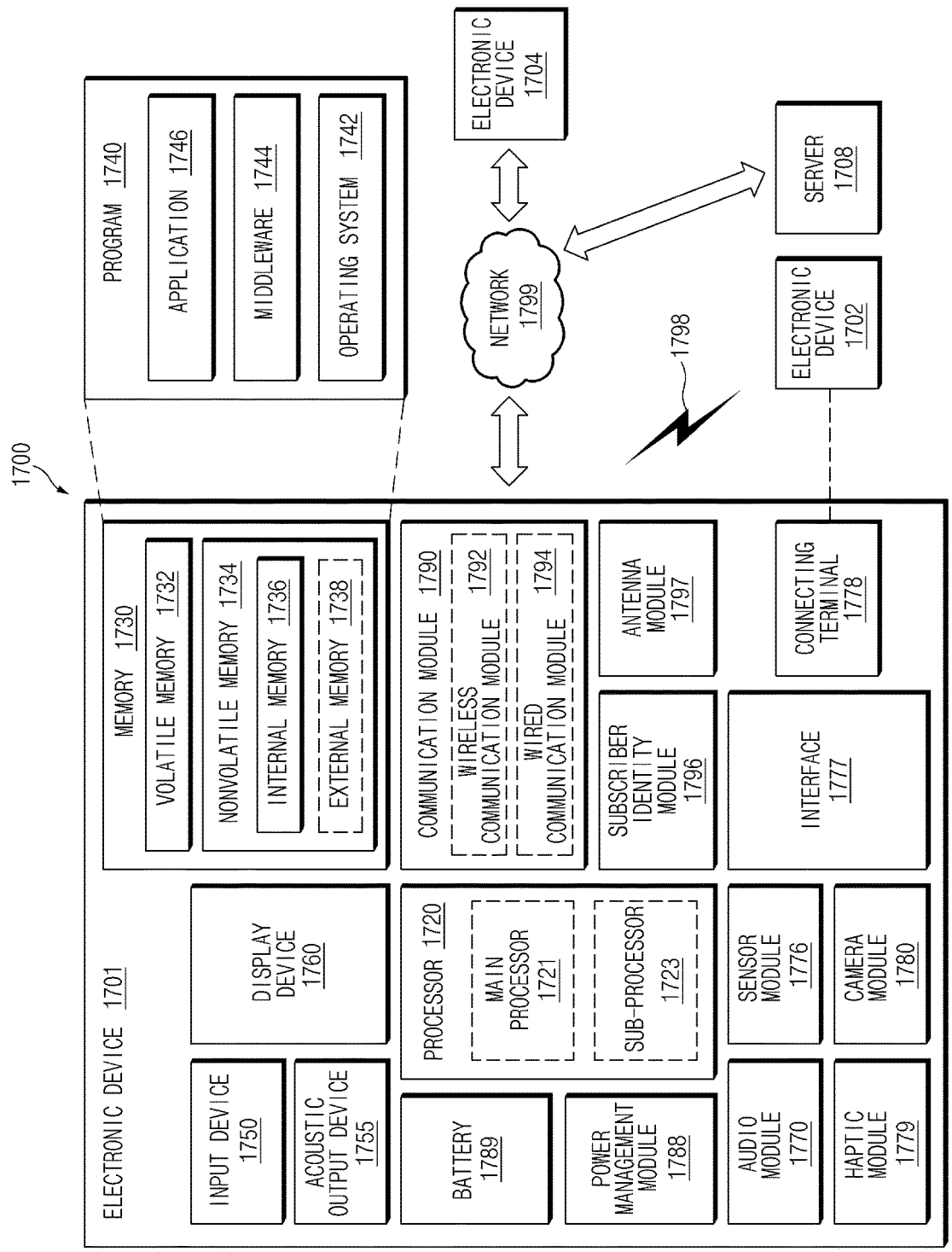
FIG. 17 is a block diagram illustrating a configuration of an electronic device in a network environment according to an embodiment.

FIG. 17 is a block diagram illustrating a configuration of an electronic device in a network environment according to an embodiment.

Referring to FIG. 17, under a network environment 1700, an electronic device 1701 may communicate with an electronic device 1702 over a first network 1798 (e.g., short-range wireless communication) or may communication with an electronic device 1704 or a server 1708 over a second network 1799 (e.g., long-range wireless communication). According to an embodiment, the electronic device 1701 may communicate with the electronic device 1704 through the server 1708. According to an embodiment, the electronic device 1701 may include a processor 1720, a memory 1730, an input device 1750, an acoustic output device 1755, a display device 1760, an audio module 1770, a sensor module 1776, an interface 1777, a haptic module 1779, a camera module 1780, a power management module 1788, a battery 1789, a communication module 1790, a subscriber identity module 1796, and an antenna module 1797. In some embodiments, the electronic device 1701 may not include at least one (e.g., the display device 1760 or the camera module 1780) of the above-described elements or may further include other element(s). In some embodiments, for example, like the sensor module 1776 (e.g., a fingerprint sensor, an iris sensor, or an illumination sensor) embedded in the display device 1760 (e.g., a display), some of the elements may be integrally implemented.

The processor 1720 may drive, for example, software (e.g., a program 1740) to control at least one other element (s) (e.g., a hardware or software element) of the electronic device 1701, connected to the processor 1720, and may process and compute various data. The processor 1720 may load a command or data, which is received from another element (e.g., the sensor module 1776 or the communication module 1790), into a volatile memory 1732 to process the command or data and may store the result data into a nonvolatile memory 1734. According to an embodiment, the processor 1720 may include a main processor 1721 (e.g., a central processing unit (CPU) or an application processor) and a sub-processor 1723 (e.g., a graphic processing device, an image signal processor, a sensor hub processor, a communication processor) which is operated independently of the main processor 1721 and, additionally or alternatively, may use a lower power than the main processor 1721 or may specialize in a specified function. The sub-processor 1723 may be operated independently of the main processor 1721 or may be embedded and operated in the main processor 1721.

In this case, the sub-processor 1723 may control, for example, at least some of functions or states associated with at least one (e.g., the display device 1760, the sensor module 1776, or the communication module 1790) of the elements of the electronic device 1701, rather than the main processor 1721 while the main processor 1721 is in an inactive state (e.g., a sleep state) or together with the main processor 1721 while the main processor 1721 is in an active state (e.g., a state where an application is performed). According to an embodiment, the sub-processor 1723 (e.g., an image signal processor or a communication processor) may be implemented as a portion of another element (e.g., the camera module 1780 or the communication module 1790) which is operatively associated. The memory 1730 may store a variety of data used by at least one (e.g., the processor 1720 or the sensor module 1776) of the elements of the electronic device 1701, for example, software (e.g., the program 1740) and input data or output data about a command associated with the software. The memory 1730 may include the volatile memory 1732 or the nonvolatile memory 1734.

The program 1740 may include software stored in the memory 1730, for example, an operating system (OS) 1742, middleware 1744, or an application 1746.

The input device 1750 may include a device for receiving a command or data to be used for an element (e.g., the processor 1720) of the electronic device 1701, for example, a microphone, a mouse, or a keyboard.

The acoustic output device 1755 may include a device for outputting an acoustic signal to the outside of the electronic device 1701, for example, a speaker used for a general purpose such as multimedia playback or record playback and a receiver used for receiving a phone call. According to an embodiment, the receiver may be integrated with the speaker or may be configured independently of the speaker.

The display device 1760 may include a device for visually providing information to a user of the electronic device 1701, for example, a display, a hologram device, or a projector, and a control circuit for controlling the corresponding device. According to an embodiment, the display device 1760 may include a touch circuitry or a pressure sensor capable of measuring strength of pressure for a touch.

The audio module 1770 may convert, for example, from a sound into an electrical signal or from an electrical signal into a sound. According to an embodiment, the audio module 1770 may obtain a sound through the input device 1750 or may output a sound through the acoustic output device 1755 or an external electronic device (e.g., the electronic device 1702 (e.g., a speaker or a headphone)) wiredly or wirelessly connected with the electronic device 1701.

The sensor module 1776 may generate an electrical signal or a data value corresponding to an internal operating state (e.g., power or temperature) of the electronic device 1701 or an external environment state. The sensor module 1776 may include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 1777 may support a specified protocol capable of being wiredly or wirelessly with an external electronic device (e.g., the electronic device 1702). According to an embodiment, the interface 1777 may include a high definition multimedia interface (HDMI), a universal serial bus (USB) interface, a secure digital (SD) card interface, or an audio interface.

The connection terminal 1778 may include a connector capable of physically connecting the electronic device 1701 with the external electronic device (e.g., the electronic device 1702), for example, an HDMI connector, a USB connector, an SD card connector, or an audio connector (e.g., a headphone connector).

The haptic module 1779 may convert an electrical signal into mechanical stimulation (e.g., vibration or motion) or electrical stimulation the user may recognize through a tactile or motion sense. The haptic module 1779 may include, for example, a motor, a piezoelectric element, or an electric stimulator.

The camera module 1780 may capture, for example, a still image and a moving image. According to an embodiment, the camera module 1780 may include at least one or more lens, an image sensor, an image signal processor, or a flash.

The power management module 1788 may be a module for managing power supplied to the electronic device 1701, for example, at least a portion of a power management integrated circuit (PMIC).

The battery 1789 may include a device for supplying power to at least one of the elements of the electronic device 1701, for example, a non-rechargeable primary cell, a rechargeable secondary cell, or a fuel cell.

The communication module 1790 may establish a wired or wireless communication channel between the electronic device 1701 and an external electronic device (e.g., the electronic device 1702, the electronic device 1704, or the server 1708). The communication module 1790 may include one or more communication processors which are operated independently of the processor 1720 (e.g., an application processor) and support wired communication or wireless communication. According to an embodiment, the communication module 1790 may include a wireless communication module 1792 (e.g., a cellular communication module, a short-range wireless communication module, or a global navigation satellite system (GNSS) communication module) or a wired communication module 1794 (e.g., a local area network (LAN) communication module or a power line communication module). The communication module 1790 may communicate with the external electronic device over the first network 1798 (e.g. a short-range communication network such as Bluetooth, wireless-fidelity (Wi-Fi) direct, or infrared data association (IrDA)) or a second network 1799 (e.g., a long-range communication network such as a cellular network, the Internet, or a computer network (e.g., an LAN or a WAN)) using a corresponding communication module between the wireless communication module 1792 and the wired communication module 1794. The above-mentioned several types of communication modules 1790 may be implemented as one chip or may be implemented with separate chips.

According to an embodiment, the wireless communication module 1792 may identify and authenticate the electronic device 1701 in a communication network using user information stored in the subscriber identity module 1796.

The antenna module 1797 may include one or more antennas for transmitting a signal or power to the outside or receiving a signal or power from the outside. According to an embodiment, the communication module 1790 (e.g., the wireless communication module 1792) may transmit a signal to the external electronic device through an antenna suitable for a communication mode or may receive a signal from the external electronic device.

Some of the elements may interconnect with each other through a communication scheme (e.g., a bus, a general purpose input/output (GPIO), a serial peripheral interface (SPI), or a mobile industry processor interface (MIPI)) between peripheral devices to exchange a signal (e.g., a command or data).

According to an embodiment, the command or the data may be transmitted or received between the electronic device 1701 and the external electronic device 1704 through the server 1708 connected to the second network 1799. Each of the electronic devices 1702 and 1704 may be a device of which the type is different from or the same as that of the electronic device 1701. According to an embodiment, all or a part of operations performed by the electronic device 1701 may be executed by another electronic device or a plurality of external electronic devices. According to an embodiment, when the electronic device 1701 executes any function or service automatically or in response to a request, the electronic device 1701 may request an external electronic device to perform at least a part of a function associated with the electronic device 1701, rather than or other than performing the function or the service internally. Receiving the request, the external electronic device may execute the requested function or the additional function and may transmit the executed result to the electronic device 1701. The electronic device 1701 may use the received result without change or may additionally process the received result to provide the requested function or service. To this end, for example, cloud computing, distributed computing, or client-server computing may be used.

The electronic device according to various embodiments disclosed in the present disclosure may be each of various types of devices. The electronic device may include at least one of, for example, a portable communication device (e.g., a smartphone), a computer device, a portable multimedia device, a portable medical device, a camera, a wearable device, or a household appliance. The electronic device according to an embodiment of the present disclosure may fail to be limited to the above-mentioned devices.

Various embodiments of the present disclosure and terms used herein are not intended to limit the technologies described in the present disclosure to specific embodiments, and it should be understood that the embodiments and the terms include modification, equivalent, and/or alternative on the corresponding embodiments described herein. With regard to description of drawings, similar elements may be marked by similar reference numerals. The terms of a singular form may include plural forms unless otherwise specified. In the disclosure disclosed herein, the expressions "A or B", "at least one of A and/or B", "A, B, or C", or "at least one of A, B, and/or C", and the like used herein may include any and all combinations of one or more of the associated listed items. Expressions such as "$1^{st}$", "$2^{nd}$" "first," or "second," refer their elements regardless of their priority or importance and may be used to distinguish one element from another element but is not limited to these components, without implying an order of importance. When an (e.g., first) element is referred to as being "(operatively or communicatively) coupled with/to" or "connected to" another (e.g., second) element, it may be directly coupled with/to or connected to the other element or an intervening element (e.g., a third element) may be present.

The term "module" used herein may include a unit, which is implemented with hardware, software, or firmware, and may be interchangeably used with the terms "logic", "logical block", "component", "circuit", or the like. The "module" may be a minimum unit of an integrated component or a part thereof or may be a minimum unit for performing one or more functions or a part thereof. For example, the "module" may be configured as an application-specific IC (ASIC).

Various embodiments of the present disclosure may be implemented with software (e.g., the program 1740) including instructions stored in a machine-readable storage media (e.g., a computer-readable storage media) (e.g., the internal memory 1736 or the external memory 1738). The machine may include a device which calls the stored instructions from the storage media and is operable according to the called instructions, for example, an electronic device (e.g., the electronic device 1701) according to the disclosed embodiments. When the instructions are executed by a processor (e.g., the processor 1720), the processor may perform a function corresponding to the instructions using other elements directly or under control of the processor. The instructions may include code generated or executed by a compiler or an interpreter. The machine-readable storage media may be provided in the form of a non-transitory storage media. Herein, the term "non-transitory" may mean that the storage media does not include a signal and is tangible and may fail to distinguish that data is semi permanently or temporarily stored in the storage media.

According to an embodiment, the method according to various embodiments disclosed in the present disclosure may be included and provided in a computer program product. The computer program product may be transacted as goods between a seller and a purchaser. The computer program product may be distributed in the form of a machine-readable storage media (e.g., a compact disc read only memory (CD-ROM)) or online through an application store (e.g. Play Store™). In case of the online distribution, at least a part of the computer program product may be at least temporarily stored in a server of a manufacturer, a server of an application store, or a storage media such as a memory of a relay server or may be temporarily generated.

Each element (e.g., a module or a program module) according to various embodiments may be implemented as single entity or a plurality of entities, and a part of the above-described sub-elements may be omitted or may further include other sub-elements. Alternatively or additionally, after being integrated in one entity, some elements (e.g., a module or a program module) may identically or similarly perform the function executed by each corresponding element before integration. According to various embodiments, operations executed by a module, a program, or other elements may be executed by a successive method, a parallel method, a repeated method, or a heuristic method, or at least a part of the operations may be executed in different sequences or omitted. Alternatively, other operations may be added.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device, comprising:
   a housing;
   a touch screen display configured to be located in the housing and be exposed through a first region of the housing;
   a microphone configured to be located in the housing and be exposed through a second region of the housing;
   at least one speaker configured to be located in the housing and be exposed through a third region of the housing;
   a wireless communication circuit configured to be located in the housing;
   a processor configured to be located in the housing and be electrically connected with the touch screen display, the microphone, the at least one speaker, and the wireless communication circuit; and
   at least one memory configured to be located in the housing and be electrically connected with the processor,
   wherein the at least one memory stores instructions, when executed, causing the processor to:
      receive a first user input including a request to perform a task which requires at least one first parameter, via the microphone;
      transmit first data based on the first user input to an external server via the wireless communication circuit;
      receive from the external server a sequence of states executable by the electronic device to perform the task based on the first data via the wireless communication circuit;
      detect whether at least one first parameter is omitted from the first user input, based on whether execution type information is received from the server with the received sequence of states;
      when the execution type information is received from the external server, display a graphical user interface (GUI) including at least one input field requesting input of the at least one first parameter; and
      when the execution type information is not received from the external server, execute a portion of the sequence of states less than an entirety of the sequence of states to perform a portion of the task.

2. The electronic device of claim 1, wherein the execution type information identifies information referenceable by a function to execute the task which is missing from the first user input.

3. The electronic device of claim 1, wherein the at least one memory further stores instructions, when executed, causing the processor to:

identify at least one second parameter omitted from the first user input among the at least one first parameter required to perform the task; and
identify an application program associated with performing the task, using information about a particular state from among the sequence of states, the particular state corresponding to the at least one identified second parameter.

4. The electronic device of claim 3, wherein the at least one memory further stores instructions, when executed, causing the processor to:
   obtain information about the at least one the second parameter required to perform the task from the identified application program.

5. The electronic device of claim 4, wherein the at least one memory further stores instructions, when executed, causing the processor to:
   receive a second user input inputting the at least one second parameter into a particular input field displayed in the GUI and displaying the at least one input second parameter in the particular input field.

6. The electronic device of claim 5, wherein the at least one memory further stores instructions, when executed, causing the processor to:
   when the at least one second parameter is displayed in the particular input field, provide at least a portion of the at least one second parameter to the identified application program.

7. The electronic device of claim 5, wherein the second user input comprises at least one of a touch input received via the touch screen display and a voice input received via the microphone.

8. The electronic device of claim 1, wherein the at least one memory further stores instructions, when executed, causing the processor to:
   receive a third user input at a time after outputting the GUI; and
   terminate displaying the GUI in response to the third user input.

9. The electronic device of claim 1, wherein the at least one memory further stores instructions, when executed, causing the processor to:
   display content associated with performing the task on a region overlapping at least a part of the displayed GUI or a region adjacent to the displayed GUI.

10. The electronic device of claim 1, wherein the at least one memory further stores instructions, when executed, causing the processor to:
    when at least a portion of the at least one first parameter required to perform the task is included in the first user input, display the parameter included in the first user input on an input field corresponding to the parameter included in the first user input included in the GUI.

11. A method in an electronic device, the method comprising:
    receiving a first user input including a request to perform a task;
    transmitting first data based on the first user input to an external server using a wireless communication circuit;
    receiving from the external server a sequence of states executable by the electronic device to perform the task;
    detecting by at least one processor whether at least one first parameter is omitted from the first user input, based on whether execution type information is received from the server with the received sequence of states;

when the execution type information is received from the external server, displaying by a touch screen display a graphical user interface (GUI) including at least one input field requesting input of the at least one first parameter; and when the execution type information is not received from the external server, executing a portion of the sequence of states less than an entirety of the sequence of states to perform a portion of the task.

12. The method of claim 11, wherein the execution type information identifies information referenceable by a function to execute the task which is missing from the first user input.

13. The method of claim 11, further comprising:
identifying at least one second parameter omitted from the first user input the at least one first parameter required to perform the task; and
identifying an application program associated with performing the task, using information about a particular state from among the sequence of states, the particular state corresponding to the at least one identified second parameter.

14. The method of claim 13, further comprising:
obtaining information about the at least one the second parameter required to perform the task from the identified application program.

15. The method of claim 14, wherein the GUI includes a plurality of input fields requesting input of multiple parameters identified as omitted from the first user input, the method further comprising:

receiving a second user input inputting the at least one second parameter into a particular input field displayed in the GUI and displaying the at least one input second parameter in the particular input field.

16. The method of claim 15, further comprising:
when the at least one second parameter is displayed in the particular input field, providing at least a portion of the at least one second parameter to the identified application program.

17. The method of claim 15, wherein the second user input comprises at least one of a touch input received via the touch screen display and a voice input received via a microphone.

18. The method of claim 11, further comprising:
receiving a third user input at a time after outputting the GUI; and
terminate displaying the GUI in response to the third user input.

19. The method of claim 11, further comprising:
displaying content associated with at least one application program associated with performing the task on a region overlapping at least a part of the displayed GUI or a region adjacent to the displayed GUI.

20. The method of claim 11, further comprising:
when at least a portion of the at least one first parameter required to perform the task is included in the first user input, displaying the parameter included in the first user input on an input field corresponding to the parameter included in the first user input included in the GUI.

* * * * *